United States Patent
Guedalia et al.

(10) Patent No.: US 9,294,514 B2
(45) Date of Patent: Mar. 22, 2016

(54) CALLER-CALLEE ASSOCIATION OF A PLURALITY OF NETWORKED DEVICES

(71) Applicant: QUALCOMM CONNECTED EXPERIENCES, INC., San Diego, CA (US)

(72) Inventors: Isaac David Guedalia, Bet Shemesh (IL); Jacob Guedalia, New York, NY (US)

(73) Assignee: QUALCOMM INCORPORATED, San Diego, CA (US)

(*) Notice: Subject to any disclaimer, the term of this patent is extended or adjusted under 35 U.S.C. 154(b) by 107 days.

(21) Appl. No.: 14/079,520

(22) Filed: Nov. 13, 2013

(65) Prior Publication Data

US 2014/0079054 A1 Mar. 20, 2014

Related U.S. Application Data

(63) Continuation of application No. 11/435,200, filed on May 15, 2006, now Pat. No. 8,856,359.

(60) Provisional application No. 60/694,674, filed on Jun. 29, 2005, provisional application No. 60/700,749, (Continued)

(51) Int. Cl.
*H04L 29/06* (2006.01)
*H04L 29/12* (2006.01)
(Continued)

(52) U.S. Cl.
CPC ...... *H04L 65/1003* (2013.01); *H04L 29/06027* (2013.01); *H04L 29/1216* (2013.01);
(Continued)

(58) Field of Classification Search
CPC . H04L 65/1006; H04L 63/08; H04L 65/1069; H04L 45/00; H04L 41/12; H04W 84/042; H04W 84/12; H04W 92/08; H04W 92/18
See application file for complete search history.

(56) References Cited

U.S. PATENT DOCUMENTS 5,875,240 A 2/1999 Silverman
5,894,512 A 4/1999 Zenner
(Continued)

FOREIGN PATENT DOCUMENTS

CN 1581901 A 2/2005
DE 10341737 A1 4/2005
(Continued)

OTHER PUBLICATIONS

Alcatel-Lucent: "Alcatel-Lucent OmniPCX Enterprise Communication Server: Delivering powerful, reliable and scalable IP communications to drive your 21st century business", 2007.
(Continued)

*Primary Examiner* — Raj Jain
(74) *Attorney, Agent, or Firm* — Muncy, Geissler, Olds & Lowe, P.C.

(57) ABSTRACT

The present disclosure generally relates to systems and methods for establishing and maintaining communication between two or more communication devices coupled to communication networks. Some specific aspects relate to communication between a plurality of communication devices each of which is coupled to a respective network. Other aspects relate to establishing such communication by way of contact lists maintained and facilitated on systems coupled to the networks. Users of multiple communication networks, such as VoIP, PSTN and wireless, employ multiple communication devices to communicate with their contacts. For example, a VoIP enabled computer is necessary to access contacts on a VoIP network and a mobile or cellular telephone is used to access contacts on wireless and PSTN networks. A contact list, stored on one communication device, in some instances, cannot be accessed from another communication device. For example, a contact list stored in a VoIP enabled computer cannot be accessed from PSTN or wireless phone devices. Various embodiments described herein provide a convenient solution that can integrate contacts stored on different communication devices and make them accessible from a single device.

17 Claims, 15 Drawing Sheets

Related U.S. Application Data filed on Jul. 20, 2005, provisional application No. 60/706,047, filed on Aug. 8, 2005, provisional application No. 60/718,305, filed on Sep. 20, 2005, provisional application No. 60/749,580, filed on Dec. 13, 2005, provisional application No. 60/762,901, filed on Jan. 30, 2006, provisional application No. 60/765,198, filed on Feb. 6, 2006.

(51) Int. Cl.
| | | |
|---|---|---|
| *H04L 29/08* | (2006.01) | |
| *H04W 84/12* | (2009.01) | |
| *H04L 12/24* | (2006.01) | |

(52) U.S. Cl.
CPC .... *H04L29/12122* (2013.01); *H04L 29/12584* (2013.01); *H04L 29/12896* (2013.01); *H04L 61/157* (2013.01); *H04L 61/1547* (2013.01); *H04L 61/2596* (2013.01); *H04L 61/605* (2013.01); *H04L 65/103* (2013.01); *H04L 65/104* (2013.01); *H04L 65/1006* (2013.01); *H04L 65/1026* (2013.01); *H04L 65/1036* (2013.01); *H04L 65/1069* (2013.01); *H04L 67/24* (2013.01); *H04L 41/12* (2013.01); *H04W 84/12* (2013.01)

(56) References Cited

U.S. PATENT DOCUMENTS

| | | | |
|---|---|---|---|
| 6,073,016 | A | 6/2000 | Hulthen et al. |
| 6,154,465 | A | 11/2000 | Pickett |
| 6,185,184 | B1 | 2/2001 | Mattaway et al. |
| 6,188,762 | B1 | 2/2001 | Shooster |
| 6,233,234 | B1 | 5/2001 | Curry et al. |
| 6,253,075 | B1 | 6/2001 | Beghtol et al. |
| 6,311,073 | B1 | 10/2001 | Charpentier et al. |
| 6,324,263 | B1 | 11/2001 | Sherwood et al. |
| 6,333,931 | B1 | 12/2001 | LaPier et al. |
| 6,496,501 | B1 | 12/2002 | Rochkind et al. |
| 6,564,261 | B1 | 5/2003 | Gudjonsson et al. |
| 6,683,870 | B1 | 1/2004 | Archer |
| 6,697,858 | B1 | 2/2004 | Ezerzer et al. |
| 6,731,630 | B1 | 5/2004 | Schuster et al. |
| 6,757,531 | B1 | 6/2004 | Haaramo et al. |
| 6,807,558 | B1 | 10/2004 | Hassett et al. |
| 6,829,349 | B1 | 12/2004 | Neale et al. |
| 6,928,294 | B2 * | 8/2005 | Maggenti et al. ............. 455/518 |
| 6,950,504 | B1 | 9/2005 | Marx et al. |
| 6,985,569 | B2 | 1/2006 | Baker |
| 7,085,260 | B2 | 8/2006 | Karaul et al. |
| 7,173,910 | B2 | 2/2007 | Goodman |
| 7,190,962 | B2 | 3/2007 | Brehler et al. |
| 7,239,629 | B1 | 7/2007 | Olshansky et al. |
| 7,274,776 | B1 | 9/2007 | Virzi et al. |
| 7,274,786 | B2 | 9/2007 | Fleischer, III et al. |
| 7,301,934 | B1 | 11/2007 | Casati et al. |
| 7,317,716 | B1 | 1/2008 | Boni et al. |
| 7,324,505 | B2 | 1/2008 | Hoover |
| 7,336,772 | B1 | 2/2008 | Velusamy |
| 7,400,881 | B2 | 7/2008 | Kallio |
| 7,450,563 | B2 | 11/2008 | Cook et al. |
| 7,472,776 | B2 | 1/2009 | Charmat |
| 7,480,733 | B2 | 1/2009 | Cernohous et al. |
| 7,502,339 | B1 | 3/2009 | Pirkola et al. |
| 7,620,404 | B2 | 11/2009 | Chesnais et al. |
| 7,907,708 | B2 | 3/2011 | Walker et al. |
| 8,082,346 | B2 | 12/2011 | Ito |
| 8,290,127 | B2 | 10/2012 | Reynolds et al. |
| 8,351,419 | B2 | 1/2013 | Guedalia et al. |
| 2001/0038624 | A1 | 11/2001 | Greenberg et al. |
| 2002/0019246 | A1 | 2/2002 | Forte |
| 2002/0068599 | A1 | 6/2002 | Rodriguez et al. |
| 2002/0075850 | A1 | 6/2002 | Cruz et al. |
| 2002/0099670 | A1 | 7/2002 | Jakobsson |
| 2002/0124100 | A1 | 9/2002 | Adams |
| 2002/0129103 | A1 | 9/2002 | Birkler et al. |
| 2002/0132611 | A1 | 9/2002 | Immonen et al. |
| 2002/0136206 | A1 | 9/2002 | Gallant et al. |
| 2002/0169984 | A1 | 11/2002 | Kumar et al. |
| 2002/0176374 | A1 | 11/2002 | Lee et al. |
| 2002/0197991 | A1 | 12/2002 | Anvekar et al. |
| 2003/0028601 | A1 | 2/2003 | Rowe |
| 2003/0091024 | A1 | 5/2003 | Stumer |
| 2003/0115138 | A1 | 6/2003 | Brown et al. |
| 2003/0118175 | A1 | 6/2003 | Hariri et al. |
| 2003/0167223 | A1 | 9/2003 | Pledereder et al. |
| 2003/0185359 | A1 | 10/2003 | Moore et al. |
| 2003/0194078 | A1 | 10/2003 | Wood et al. |
| 2004/0044771 | A1 | 3/2004 | Allred et al. |
| 2004/0047339 | A1 * | 3/2004 | Wang et al. ................... 370/352 |
| 2004/0076139 | A1 | 4/2004 | Kang-Yeh et al. |
| 2004/0157629 | A1 | 8/2004 | Kallio et al. |
| 2004/0165712 | A1 * | 8/2004 | Boyle et al. ............. 379/220.01 |
| 2004/0165714 | A1 | 8/2004 | Pinault |
| 2004/0179669 | A1 | 9/2004 | Gilbert et al. |
| 2004/0193601 | A1 | 9/2004 | Hu et al. |
| 2004/0202117 | A1 | 10/2004 | Wilson et al. |
| 2004/0202187 | A1 | 10/2004 | Kelly et al. |
| 2004/0203643 | A1 | 10/2004 | Bhogal et al. |
| 2004/0213209 | A1 | 10/2004 | O'Connor et al. |
| 2005/0025043 | A1 | 2/2005 | Mussman et al. |
| 2005/0027716 | A1 | 2/2005 | Apfel |
| 2005/0027867 | A1 | 2/2005 | Mueller et al. |
| 2005/0036597 | A1 | 2/2005 | Kobrosly et al. |
| 2005/0059418 | A1 | 3/2005 | Northcutt |
| 2005/0070230 | A1 | 3/2005 | Das et al. |
| 2005/0083940 | A1 | 4/2005 | Eales et al. |
| 2005/0088999 | A1 | 4/2005 | Waylett et al. |
| 2005/0163065 | A1 | 7/2005 | Yule |
| 2005/0186960 | A1 | 8/2005 | Jiang |
| 2005/0221847 | A1 | 10/2005 | Brehler et al. |
| 2005/0243809 | A1 | 11/2005 | Best et al. |
| 2005/0273512 | A1 | 12/2005 | Cho |
| 2005/0289180 | A1 | 12/2005 | Pabla et al. |
| 2006/0092917 | A1 | 5/2006 | Kucmerowski et al. |
| 2006/0114883 | A1 | 6/2006 | Mehta et al. |
| 2006/0167991 | A1 | 7/2006 | Heikes et al. |
| 2006/0168326 | A1 | 7/2006 | Baldwin et al. |
| 2006/0222156 | A1 | 10/2006 | Smith et al. |
| 2006/0236388 | A1 | 10/2006 | Ying et al. |
| 2006/0246877 | A1 | 11/2006 | Kashanian et al. |
| 2006/0258330 | A1 | 11/2006 | Guedalia et al. |
| 2007/0005776 | A1 | 1/2007 | Hansen et al. |
| 2007/0071006 | A1 | 3/2007 | Bosch et al. |
| 2007/0112964 | A1 | 5/2007 | Guedalia et al. |
| 2007/0143397 | A1 | 6/2007 | Guedalia et al. |
| 2007/0162350 | A1 | 7/2007 | Friedman |
| 2007/0281676 | A1 | 12/2007 | Borras et al. |
| 2007/0287430 | A1 | 12/2007 | Hosain et al. |
| 2007/0293207 | A1 | 12/2007 | Guedalia et al. |
| 2008/0013531 | A1 | 1/2008 | Elliott et al. |
| 2008/0076409 | A1 | 3/2008 | Hinrikus et al. |
| 2008/0096592 | A1 | 4/2008 | Waytena et al. |
| 2008/0139210 | A1 | 6/2008 | Gisby et al. |
| 2008/0159515 | A1 | 7/2008 | Rines |
| 2008/0222127 | A1 | 9/2008 | Bergin |
| 2008/0263170 | A1 | 10/2008 | Caron et al. |
| 2013/0121215 | A1 | 5/2013 | Guedalia et al. |
| 2013/0281057 | A1 | 10/2013 | Bender et al. |
| 2014/0323103 | A1 | 10/2014 | Guedalia et al. |

FOREIGN PATENT DOCUMENTS

| | | |
|---|---|---|
| EP | 1179941 A2 | 2/2002 |
| EP | 1517256 A2 | 3/2005 |
| EP | 1701569 A1 | 9/2006 |
| GB | 2391135 A | 1/2004 |
| KR | 20020018238 A | 3/2002 |
| WO | WO-9723083 A1 | 6/1997 |
| WO | WO-9847298 A2 | 10/1998 |
| WO | WO-9934628 A1 | 7/1999 |
| WO | WO-0198867 A2 | 12/2001 |

(56) References Cited

FOREIGN PATENT DOCUMENTS

| WO | WO-0215030 A1 | 2/2002 |
|----|---------------|--------|
| WO | WO-0221779 A1 | 3/2002 |
| WO | WO-0239237 A2 | 5/2002 |
| WO | WO-03032613 A1 | 4/2003 |
| WO | WO-03094011 A1 | 11/2003 |
| WO | WO-2005065296 A2 | 7/2005 |
| WO | WO-2006039552 A2 | 4/2006 |
| WO | WO-2006044654 A2 | 4/2006 |
| WO | WO-2007001850 A1 | 1/2007 |
| WO | WO-2007005124 | 1/2007 |
| WO | WO-2007025373 A1 | 3/2007 |
| WO | WO-2007109559 A2 | 9/2007 |
| WO | WO-2008013642 A2 | 1/2008 |

OTHER PUBLICATIONS

Case Study, Intel Centrino, Mobile Technology, Intel Xeon Processor MP, Shanghai GM, Seamless Communications, Jan. 2006, http://www.intel.com/netcomms/technologies/voice/310998.pdf.

Griffin, et al., "Integrating SIP, Presence and FTP to provide Wireless Multimedia Messaging", Wireless Communications and Networking Conference, 2004 IEEE Communications Society, vol. 4, pp. 2581-2586, 2004.

Handley, et al., "RFC 2543, SIP: Session Initiation Protocol" IETF Standard, Internet Engineering Task Force, pp. 1-153, Mar. 1999.

Ho, Colman: "Voice Over Internet Protocol (VoIP) Overview", Presentation to TSACC, Mar. 23, 2004; http://www.isacc.ca/isacci_doc/ArchivedPlenary/TSACC-04-31305.pdf.

Intel Communications Alliance, "TeleSym and Intel Deliver Voice-over-internet-Protocol (VoIP) Enterprise Communication Solution", Jun. 2004, http://www.intel.com/network/csp/pdf/9003wp.pdf.

International Search Report and Written Opinion—PCT/US2007/087268, International Searching Authority—European Patent Office, Aug. 1, 2008.

International Search Report and Written Opinion—PCT/US2008/055118, International Searching Authority—European Patent Office, Sep. 5, 2008.

International Search Report for PCT/US2006/019135, mailed Jan. 16, 2007.

Invitation to Pay Additional Fees for PCT/US2006/019135, mailed Oct. 6, 2006.

Lundqvist, Janne, et al., "Messaging-over-IP—A network for messaging and information services"; http://www.ericsson.com/ericsson/corpinfo/publications/review/1999_03/files/1999035.pdf.

MMusic WG Handley/Schulzrinne/Schooler ISI/Columbia U/Caltech: "SIP: Session Initiation Protocol; draft-ietf-mmusic-sip-04.txt;" IETF Standard-Working-Draft, Internet Engineering Task Force, IETC, CH, vol. mmusic, No. 4, Nov. 11, 1997, XP015023259, ISSN: 0000-0004, pp. 1-83, p. 8, line 1-p. 9, line 7 p. 53, line 11-p. 54, line 10.

NST, New Standard Telephony, Convergence Simplified, Company Profile, NST 2005, http://www.ns-tel.com/files/NST_Company_Profile.pdf.

Petrie, Pingtel Corp., "A Framework for SIP User Agent Profile Delivery", draft-ietf-sipping-config-framework-02.txt, IETF Standard-Working-Draft, Internet Engineering Task Force, No. 2, pp. 1-22, 2004.

Rosenberg J et al:RFAC 3261: "SIP: Session Initiation Protocol" 20020601; 20020600, Jun. 1, 2002, pp. 1-269, XP015009039.

Schulzrinne, H., et al., "Dynamic Host Configuration Protocol (DHCPv6) Options for Session Initiation Protocol (SIP) Servers" RFC 3319, IETF Standard, Internet Engineering Task Force, IETF, CH. Jul. 1, 2003, XP015009189; ISSN: 0000-0003.

Shanmugham, et al., "Media Resource Control Protocol Version 2 (MRCPv2)", IETF Standard-Working-Draft, Internet Engineering Task Force, IETF, vol. Speechsc, No. 6, pp. 1-176, 2005.

Singh, Kundan Narendra; Thesis, "Reliable, Sealable and Interoperable Internet Telephony", Columbia University, 2006, http://www1.cs.columbia.edu/~kns10/publication/thesis.pdf.

Sinnreich, et al., "SIP Telephony Device Requirements and Configuration", draft-sinnreich-sipdev-req-07.txt, IETF Standard-Working-Draft, Internet Engineering Task Force, No. 7, pp. 1-37, 2005.

SIP Connect, "CableLabs Proposal for SIP Connect 1.1", 2007, http://www.sipforum.org/component/option.com_docman/task.doc_view/gid.149/Itemid.75/.

Written Opinion—PCT/US2006/019135, International Searching Authority—European Patent Office, Jan. 16, 2007.

Wikipedia, "GPRS Core Network" [Online], Jul. 12, 2004 [Retrieved on Sep. 18, 2015], www.wikipedia.org, Retrieved from: < https://web.archive.org/web/20040813011426/http://en.wikipedia.org/wiki/GPRS_core_network>.

* cited by examiner

CALLER-CALLEE ASSOCIATION OF A PLURALITY OF NETWORKED DEVICES

REFERENCE TO RELATED APPLICATIONS

This application is a continuation of U.S. application Ser. No. 11/435,200, entitled "CALLER-CALLEE ASSOCIATION OF A PLURALITY OF NETWORKED DEVICES", filed on May 15, 2006, which in turn claims the benefit of U.S. Provisional Application No. 60/694,674, entitled "A System for Personal Switching and Routing," filed on Jun. 29, 2005; No. 60/700,749, entitled "A Method for a User Provisioned Communication Client With Presence," filed on Jul. 20, 2005; No. 60/706,047, entitled "A Method for a Set of Personalized Extensions," filed on Aug. 8, 2005; No. 60/718,305, entitled "Personalized Extensions," filed on Sep. 20, 2005; No. 60/749,580, entitled "VoIP Service Extensions," filed ort Dec. 13, 2005; No. 60/762,901, entitled "VoIP Thin Client," filed on Jan. 30, 2006; and No. 60/765,198, entitled "A Method for Correlating a Caller with a Callee," filed on Feb. 6, 2006, all of which are hereby fully incorporated by reference. This application also finds support and incorporates by reference U.S. Provisional Application No. 60/644,571, entitled "A system for a local access to a mobile network," and U.S. patent application Ser. No. 11/333,533, entitled "Local Access to a Mobile Network".

BACKGROUND

Systems for communicating voice information have been in use for some time, and typically include telephone communication systems. Communication systems and methods for using traditional telephones, including analog and digital systems have evolved to use various communication networks. These networks and supporting systems include "plain old telephone service" (POTS), public switched telephone networks (PSTN), cellular networks for mobile phones, and others. More recently, the Internet has also been used to carry real-time or near real-time voice communication signals from one point to another. Routing, switching, bridging, and other methods of packaging and delivering data from voice communications is in use but continues to evolve. More effective, less costly, and better quality communication systems and methods for using the same are needed, which this disclosure provides.

SUMMARY

The present disclosure generally relates to systems and methods for establishing and maintaining communication between two or more communication devices coupled to communication networks. Some specific aspects relate to communication between a plurality of communication devices each of which is coupled to a respective network. Other aspects relate to establishing such communication by way of contact lists maintained and facilitated on systems coupled to the networks.

FIG. 1 illustrates a network having multiple paths for communication of information through and over the network. In fact, more than one network can be coupled through ways known to those skilled in the art such as routing, bridging and the like. The end effect is to create a system of interconnected components which can exchange data to communicate information therebetween.

The data is commonly digital in nature in modern communication systems, but the present discussion is not so limited. For example, electronic signals, pulses, optical, acoustical, and other electromagnetic means for modulating communication signals can be used to communicate information across one or more legs of a network or networks. The signals may travel across the network or networks substantially in real time, with only the propagation delays associated therewith. The signals may alternately be interrupted by intervening components on the network or networks, buffered, stored, routed, bridged, etc., which introduces other latencies and delays into the propagation.

One goal of communication systems is to allow two or more devices, or users thereof, to exchange information, usually across some geographical or logical distance from one another. An example of this is a telephone, whether hard wired or wireless. Another example is a pair of communicating peer computers exchanging messages over the Internet. Internet communication is well-established and provides protocols for data transfer, such as the Internet Protocol (IP).

FIG. 1 specifically shows several interconnected networks and devices that provide telephonic (e.g., voice) communication between two or more communication devices coupled to the collection of networks and devices. The interconnected networks and devices include a Public Switched Telephone Network (PSTN) 11, a Voice over Internet Protocol (VoIP) network 31 and a wireless network 51.

PSTN 11 is a collection of interconnected public telephone networks, designed primarily for voice communications. It also comprises a collection of Private Branch Exchange (PBX) systems 20 that provide switching functionality for a collection of telephones 10. PBX systems are usually used in the office or campus environment. When a telephone 10 is registered on the PBX network, it is usually assigned an identifier, such as an extension. Other members of the PBX and PSTN networks can access the telephone 10 using the appropriate extension.

Wireless networks 51 deliver voice and data information to wireless telephones 60. Wireless telephones 60 are small, light devices that communicate with other devices by transmitting radio signals. Unfortunately, wireless phone communications are still expensive, especially when used for making long-distance and international calls.

VoIP networks 31 deliver voice and data over the Internet Protocol. They provide a free or very inexpensive way to transmit a voice signal from one location to another. VoIP networks 31 are also used to provide intermediate connections for other communication networks. For instance, FIG. 1 shows a PSTN network 11 communicating with a wireless network 51 over the VoIP network 31. Telephone 10 sends a voice signal to the PBX 20. PBX 20 forwards the signal to the PSTN/VoIP Gateway 30, PSTN/VoIP Gateway 30 forwards the signal to the VoIP/Mobile gateway 40. VoIP/Mobile gateway forwards the signal to the Gateway Mobil Switching Center (GMSC) 50. GMSC 50 transmits the signal to the destination wireless phone 60. Some of the intermediate connections are not shown on this signal flow diagram.

VoIP Network 31 also supports voice communications between VoIP enabled computers 35 and 45. VoIP enabled computer 35 connects to the VoIP enabled computer 45 using a network identifier, such as an IP address, user name or a contact access code. After the connection is established VoIP enabled computer 35, either directly or indirectly (by using a server, not shown on FIG. 1), transfers a digitized voice signal over the VoIP network to the VoIP enabled computer 45. In one embodiment, VoIP enabled computer 45 converts the digital signal back to the analog and presents it to the user. Some of the intermediate connections are not shown on this signal flow diagram.

Multiple VoIP service providers use different communication protocols and software applications to transmit the digitized voice signal from one VoIP enabled computer to another. Consequently, one VoIP software application may have difficulties or be completely unable to communicate with another VoIP software application. For example, a member of a first network may have difficulties communicating with a member of a second network.

VoIP Networks 31, also provide an inexpensive way to establish voice communications between VoIP enabled computers 35 and telephones residing on PSTN networks 11 and wireless networks 51. Various VoIP service providers bridge the communication between VoIP, PSTN and wireless networks by translating the communication protocol of one network into the communication protocol of another. For example, customers of a VoIP service pay for an option to make phone calls from the VoIP enabled computers to PSTN or wireless phones. Similarly, some customers pay for an option to receive phone calls from PSTN or Wireless phones on their VoIP phone devices.

When the communication, targeted to a VoIP enabled computer is initiated by a member of a PSTN or a wireless network, the signal needs to be appropriately delivered to the targeted VoIP enabled computer. Generally, PSTN or wireless phone devices use a regular phone number that eventually gets translated into an address of the appropriate VoIP enabled computer. This address may be represented by a network IP address, user name, email address or a contact access code assigned to the VoIP enabled computer by the service provider.

One or more embodiments disclosed herein provide a method for establishing communication between a first device and a second device, including, at a server, receiving a communication request from said first device coupled to said server over a network; at the server, receiving a caller identification code from said first device identifying said first device or its user; at the server, receiving an alphanumeric code from said first device identifying a callee user of said second device; at the server, associating said alphanumeric code with a callee address stored at the server, said caller identification and said alphanumeric code and said callee address all being associated with a contacts list accessible to said server; and responsive to said communication request and said alphanumeric code and associated callee address, the server establishing said communication between said first device and said second device associated with said callee address such that said first and second devices communicate over said network.

Other embodiments are directed to a method further comprising providing from said server to said first device information corresponding to said contacts list and including information indicative of a state of presence of at least one contact in said contacts list.

Other embodiments are directed to a method wherein said state of presence comprises a state on being presently connected to a communication network.

Other embodiments are directed to a method wherein said state of presence comprises a permission state indicating that communication with said second device is permissible.

Other embodiments are directed to a method wherein said server carries data from voice communication signals between said first and second devices.

Other embodiments are directed to a method wherein said server passes said callee address to a second server that carries data from voice communication signals between said first and second devices.

Other embodiments are directed to a method further comprising receiving at a second server a telephone call from said first device, said telephone call being served to its destination by said second server following said second server obtaining destination information from said server, said destination information including a callee network address.

Other embodiments are directed to a method wherein associating said alphanumeric code and said callee address comprises looking up a network address of a user represented on said server by said alphanumeric code from a contacts lists associated with a user of said first device.

Other embodiments are directed to a method wherein said looking up comprises looking up said network address on an address server that provides address lookup services to said server.

Other embodiments are directed to a method further comprising authenticating a contacts list update request from the first device.

Other embodiments are directed to a method further comprising authenticating the communication request from the first device.

Other embodiments are directed to a method wherein said alphanumeric code comprises a plurality of any of the standard ASCII characters.

Other embodiments are directed to a method wherein said alphanumeric code consists of a plurality of characters in the alphabetical range "A" through "Z".

Other embodiments are directed to a method wherein said alphanumeric code consists of a plurality of characters selected from the alphabetical range "A" through "Z" and numbers from the integer range "0" (zero) through "9".

Other embodiments are directed to a method wherein said method provides communication between a first mobile communication device and a second mobile communication device.

Yet other embodiments are directed to a method for establishing communication between a first device and a second device, including receiving from the first device a contacts update request including first device identification information; responsive to said contacts update request, sending to the first device a contacts list associated with the first device identification information, said contacts list including a contact identifier for each contact in the contacts list; receiving from the first device a connection request, the connection request identifying at least one contact identifier; mapping said contact identifier to an address of the second device; and using said address of the second device to establish communication between the first device and the second device.

Other embodiments are directed to a method further comprising authenticating the contacts update request from the first device.

Other embodiments are directed to a method further comprising authenticating the connection request from the first device.

Other embodiments are directed to a method further comprising indicating to the first device which contacts from said contacts list are currently available for communication.

Other embodiments are directed to a method wherein indicating which contacts are currently available further comprises referencing presence information for said contacts to determine which contacts are currently available for communication.

Other embodiments are directed to a method farther comprising establishing a digital communication connection to the first device over which said contacts list information is passed.

Other embodiments are directed to a method wherein establishing said digital communication connection comprises establishing said digital communication connection over a SIP compatible channel.

Other embodiments are directed to a method further comprising establishing a voice communication connection between said first and second devices.

Other embodiments are directed to a method wherein establishing said voice communication connection comprises establishing a voice communication connection over a SS7 compatible channel.

Other embodiments are directed to a method wherein establishing said voice communication connection comprises establishing a voice communication connection using a telephony communication standard protocol.

Other embodiments are directed to a method wherein the first device comprises a wireless telephony communication device.

Other embodiments are directed to a method wherein the second device comprises a voice over IP communication device.

Other embodiments are directed to a method further comprising correlating said contact identifier with an IP address associated with said second device.

Other embodiments are directed to a method further comprising correlating said contact identifier with a telephone number associated with said second device.

Other embodiments are directed to a method further comprising coupling at least two networks to establish said communication between said first and second devices, said at least two networks including at least a PSTN.

Other embodiments are directed to a method further comprising coupling at least two networks to establish said communication between said first and second devices, said at least two networks including at least an IP network.

Other embodiments are directed to a method further comprising coupling at least two networks to establish said communication between said first and second devices, said at least two networks including at least a cellular communication network.

Other embodiments are directed to a method further comprising updating said contacts list on a server coupled to a communication network that can be in turn coupled to said first device.

Other embodiments are directed to a method further comprising updating said contacts list on a server coupled to a communication network that can be in turn coupled to said second device.

Other embodiments are directed to a method wherein establishing said communication comprises bridging a communication between a first PSTN compatible network and a second voice over IP compatible network.

Other embodiments are directed to a method further comprising maintaining a plurality of contacts lists associated with a first peer user of said first device, said plurality of contacts lists being kept in a corresponding plurality of databases, each database including a corresponding contacts list.

Other embodiments are directed to a method wherein said plurality of databases are coupled to a plurality of servers.

Other embodiments are directed to a method further comprising redirecting said first device's connection request to one of a plurality of servers adapted for processing said communication between said first and said devices.

Other embodiments are directed to a method further comprising redirecting voice communication packets exchanged between said first and second devices through at least one server coupled to both a first network associated with said first device and to a second network associated with said second device.

Other embodiments are directed to a method wherein said at least one server communicates with said first network over a first communication protocol and communicates with said second network over a second communication protocol.

Other embodiments are directed to a method wherein said method provides communication between a first mobile communication device and a second mobile communication device.

Still other embodiments are directed to a system for establishing communication between a first device and a second device, including a communication port adapted to receive from the first device a contacts update request including first device identification information; a data storage unit that stores a contacts list associated with said first device identification information, said contacts list including a contact identifier for each contact in the contacts list; a processor coupled to said communication port and coupled to said data storage unit that receives said contacts update request by way of said communication port and responds to said contacts update request by sending information from said contacts list to the first device by way of said communication port; said processor further adapted to receive from the first device a connection request by way of said communication port, the connection request identifying at least one contact identifier; said processor further adapted to associate said contact identifier with an address of the second device; and said processor further adapted to using said address of the second device to establish communication between the first and second devices.

Other embodiments are directed to a system wherein said processor is disposed on a server adapted to communicate over a communication channel with said first and second devices.

Other embodiments are directed to a system wherein said processor is disposed on a server adapted to communicate with said first device over a first communication channel and with said second device over a second communication channel.

Other embodiments are directed to a system wherein said first communication channel comprises a mobile network and said second communication channel comprises a voice over IP (VoIP) network.

Other embodiments are directed to a system further comprising a second communication port adapted for communicating with said second device.

Other embodiments are directed to a system wherein said processor comprises a server running a first process that communicates with said first device using a first communication protocol and communicates with said second device using a second communication protocol.

Other embodiments are directed to a system wherein said processor is adapted for establishing communication between the first, second, and a third device.

Other embodiments are directed to a system further comprising a data structure stored on said data storage device, said data structure including information corresponding to said contacts and further including information corresponding to a state of said contacts.

Other embodiments are directed to a system wherein said state comprises a state of presence on a network.

Other embodiments are directed to a system wherein said method provides communication between a first mobile communication device and a second mobile communication device.

And other embodiments are directed to a system for providing communication between a first device coupled to a mobile network and a second device coupled to a data network, including a first server computer coupled to said first device through at least said mobile network using a mobile communication protocol; a first data storage apparatus, coupled to said first server computer, having a contacts list associated with said first device, said contacts list including information corresponding to a plurality of contacts, and said contacts list corresponding to first device identification information; a second computer, coupled to said first server computer through at least a data network; and a second data storage apparatus, coupled to said second computer, having data stored thereon and usable to establish a communication connection between said first server computer and said second computer; wherein said second computer also being configured to communicate with a third computer using voice over internet protocol (VoIP) communication.

Still other embodiments are directed to a signaling system for establishing communication between a first mobile telephony device coupled to a mobile telephony network and a second communication device coupled to a data network, including first communication means for signaling communication between said first mobile telephony device and a server; a data storage and retrieval means, coupled to said server, for storing and maintaining a server contacts list of a plurality of contacts associated with said first mobile telephony device; a mobile contacts list correlated with said server contacts list and indicative of a state of information in said server contacts list, said mobile contacts list being accessible by said first mobile telephony device to provide a selected one or more contacts from said mobile contacts list to said server; and a second communication means for signaling communication between said second communication device and said server according to an address correlation at said server correlating said selected one or more contacts received over said mobile telephony network with a corresponding data network address of said second communication device.

Still other embodiments are directed to an apparatus for communication over a network, including a data storage component for storing a contacts list on-board said apparatus; a display permitting perception of a state of a contact from said stored contacts list; a selector permitting entry of a selection to select at least said contact from said stored contacts list; a transmitter that transmits a communication request signal from said apparatus over said network, the communication request signal including information corresponding to at least: an identification of said apparatus caller identification code, and an identification for said contact, said identification for said contact including a direct inward dial (DID) code for a destination associated with said contact.

Other embodiments are directed to an apparatus wherein said apparatus comprises a mobile device communicating over a wireless cellular communication network.

Other embodiments are directed to an apparatus wherein the display comprises a screen that provides a visual display of a plurality of contacts from said contacts list and permits perception of a state of presence of said contact.

Other embodiments are directed to an apparatus wherein the selector comprises a hardware user interface element that is constructed to receive an input from a user to select said contact from said stored contacts list.

Other embodiments are directed to an apparatus further comprising a receiver permitting receipt of contacts list information from a server over said network.

Other embodiments are directed to an apparatus wherein said state of said contact comprises a state of availability of said contact for communication.

Other embodiments are directed to an apparatus wherein said state of said contact comprises a permission state set by said contact indicating whether said contact may be called.

Other embodiments are directed to an apparatus wherein said transmitter comprises a digital transmission feature that transmits digital information comprising: the identification of said apparatus caller identification code, and said identification for said contact.

Various features and advantages provided by the instant invention or inventions, as well as preferred systems and methods for implementing the same are given below.

IN THE DRAWINGS

The invention(s) herein described, where helpful, have been described in part by the following drawings, in which.

DETAILED DESCRIPTION

The method and apparatus described herein generally relates to establishing a voice communication between multiple communication devices coupled to communication networks and thereby associating a caller (who initiates a call) and a callee (who is the subject of the call initiated by the caller).

Users of multiple communication networks, such as VoIP, PSTN and wireless, employ multiple communication devices to communicate with their contacts. For example, a VoIP enabled computer is necessary to access contacts on a VoIP network and a mobile or cellular telephone is used to access contacts on wireless and PSTN networks. A contact list, stored on one communication device, in some instances, cannot be accessed from another communication device. For example, a live or active or dynamic contact list indicating which contacts are online and which are not (e.g. a state of presence) stored in a VoIP enabled computer normally cannot be accessed from PSTN or wireless phone devices. Various embodiments described herein provide a convenient solution that can integrate contacts stored on different communication devices and make them accessible from a single device.

Figure 1:
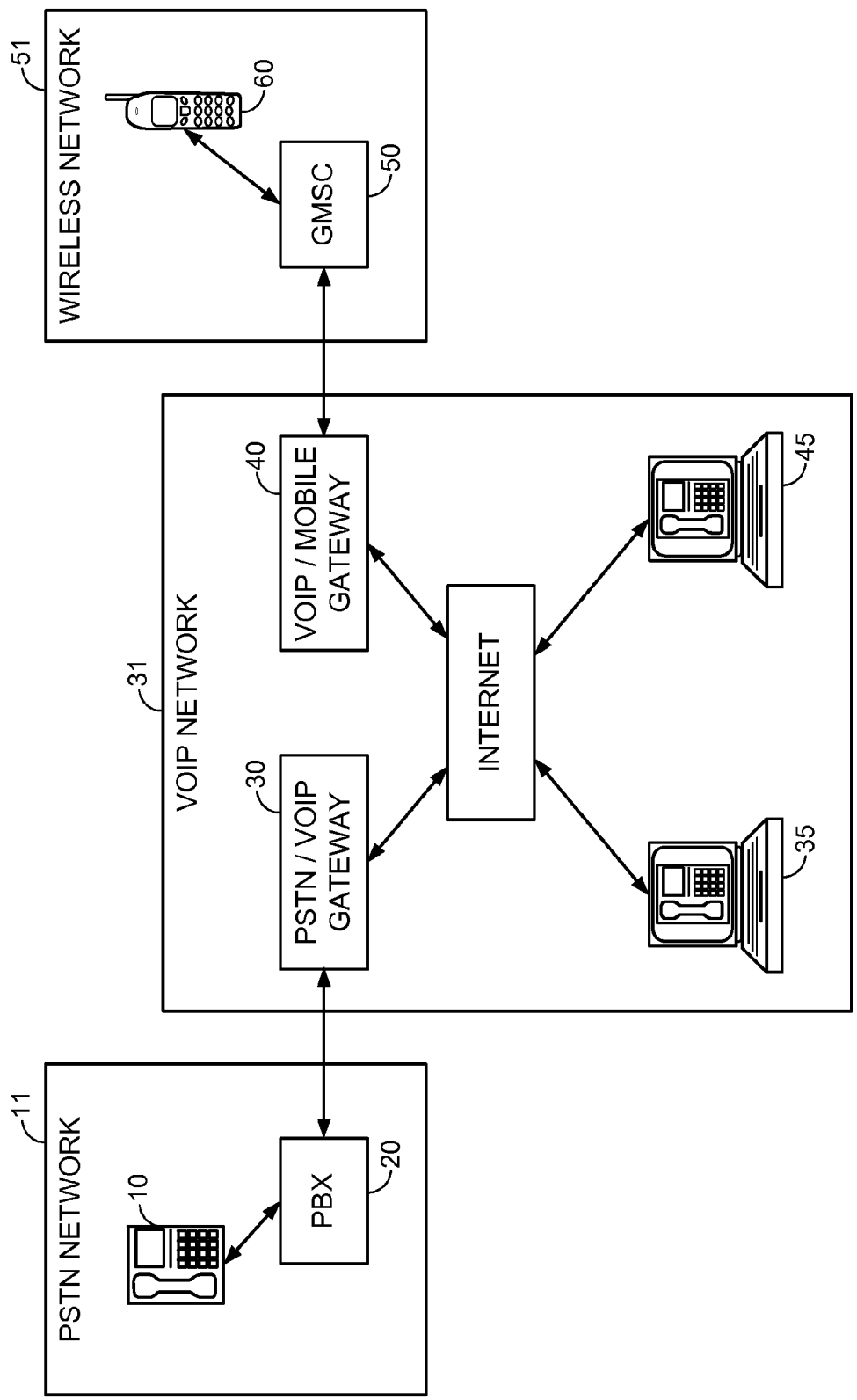
FIG. 1 illustrates an example network and associated communication apparatus.
Figure 2:
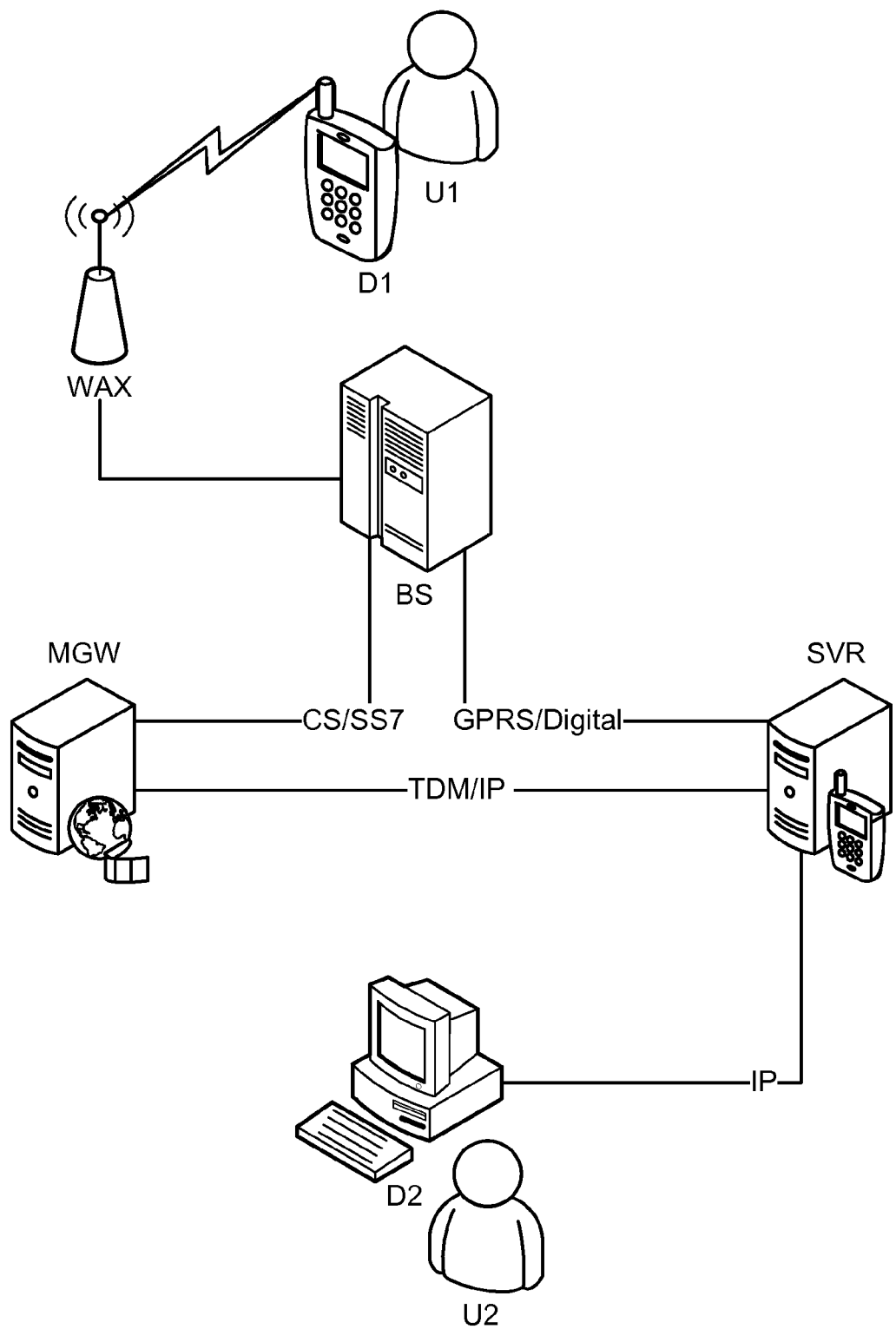
FIG. 2 illustrates an exemplary network and associated communication apparatus for communication between at least a first and a second device.

FIG. 2 illustrates a system for establishing and carrying out communication between two users, which may be persons, U1 and U2, according to one or more embodiments disclosed herein. A first device D1 owned or operated by a user U1 that are in wireless communication with a wireless access point WAX over a wireless communication frequency or channel such as those in use in cellular networks. The wireless access point WAX comprises an antenna and receiver transmitter hardware and software to enable sending and receiving information to and from wireless device D1. Wireless access point WAX is coupled to a base station BS which comprises a processor and communication ports to handle processing and data exchange with wireless access point WAX and with one or more other points on one or more networks coupled to base station BS. Therefore, base station BS can be considered a computer apparatus or a network apparatus or a communication apparatus or a server, and the nomenclature for this and other components coupled to the various networks described herein is not limiting or specific to the exclusion of other forms of the components providing the same or equivalent functionality.

Base station BS is coupled to a server SVR, which may be a dedicated communication server having a processor and a storage medium coupled thereto. Base station BS and server SVR are directly or indirectly coupled to one another and configured to exchange data over a suitable channel such as the General Packet Radio System (GPRS) or other digital communication channel.

Base station BS is also coupled to a media gateway MGW, such as a SIP media gateway. Base station BS and media gateway MGW are arranged and configured to exchange information over a circuit switched (CS) or SS7 protocol. The media gateway MGW may be in some embodiments a SIP media gateway.

Additionally, media gateway MGW and server SVR are coupled, directly or through other network components that are not shown in the figure to each other so that they may communicate using time domain multiplexing (TDM) or IP or another suitable or equivalent protocol.

Server SVR is coupled over an IP or similar or other appropriate protocol to the second device D2. The server SVR and second device D2 may typically be coupled over one or more legs of an Internet network connection, and other intermediate routers, gates, servers, and networking components that are not shown in the figure could intervene between server SVR and device D2. User U2 owns and/or operates second device D2.

With the system arranged and configured as shown in exemplary embodiments covered by FIG. 2 or those functionally equivalent thereto, communication may be established and maintained between devices D1 and D2 and their users, U1 and U2. Such communication can be initiated by either party. Such communication may be substantially voice-based (speech) communication carried out substantially in real time or an approximation thereof so that a "live" conversation is possible between users U1 and U2. Other functions of speech and voice communication systems, e.g. voice messaging, forwarding, speech recognition, archiving, etc. are possible using this system and systems based thereon with auxiliary and ancillary components not all of which are shown in the figure, but which can be appreciated and adapted by those skilled in the art upon appreciation of the present system and methods for its use.

In one or more embodiments, user U1 initiates a voice communication "call" to user U2. User U1 is thus the "caller" and user U2 is the "callee" in this scenario. The sequence begins with an action at the first device D1. The action can be an actuation of a feature of device D1 such as a button, knob, switch, area of a touch pad or touch screen, or a software feature. The action may also include or comprise voice or other types of actuation of an act on device D1, e.g. speech recognition actuation of a command in software and/or hardware on device D1.

Device D1 having been acted on by user U1 and being in wireless communication with wireless access point WAX is adapted for exchanging signals and data across the wireless connection linking D1 and WAX. In gridded cellular systems, device D1 may be a cellular telephone equipped with GPRS capability and may hop from one wireless access point to another as the device is transported or handed off between cells in the grid.

Device D1 and/or user U1 then "logs on" to server SYR over the portions of the communication path or network between device D1 and server SVR. This process is generally known to those skilled in the art and involves any of a number of authentication steps so that server SVR can determine the identity of device D1 and/or its user U1 to an acceptable degree of certainty. This may involve an authentication sequence whereby device D1 and/or user U1 provide a user name or a password to server SVR. Also, the identity of device D1 may be transmitted through a serial number or other coded hardware and/or software scheme that identifies the processor, a key, or software or other token on device D1. Server SVR may look up the authentication log on information from device D1/user U1 directly, e.g. on a lookup table, or using an authentication server or client software on or coupled to or accessible to server SVR.

Communication between device D1 and server SVR can be accomplished by device D1 dialing (telephonic call) a predetermined telephone number, which is answered at media gateway MGW by a process programmed to deliver that communication or route or bridge the communication through to server SVR. This can be generalized to other than the mode described herein to include identification codes beyond the predetermined telephone number.

Server SVR may further receive from device D1 a request for an up-to-date contacts list that belongs to device D1 or user U1. That is, as described elsewhere in this document, a contacts list associated with user U1 or device D1 may be kept on or accessible to server SVR that may change with time and be editable and updateable. This contacts list can be requested by device D1 with each log on, or may be requested or "pulled" by device D1 periodically or by an explicit request action from user U1. Alternately, the contacts list may be "pushed" by server SVR to device D1 without device D1 or user U1 having requested or pulled the contacts list. Once logged on and authenticated, device D1 is left with a contacts list or information therefrom that identifies at least one contact and contact information that relates to a property of said contact. The contact information may be for example a name, a telephone number, an address, a network identifier, or other information, and the contact may be a person, an individual, or a group of persons with a common association.

In one or more embodiments, the contacts list provided to device D1 from server SVR reflects a current or approximately current state such as a network presence state. So for example, if user U1 has several contacts or "buddies" in U1's contacts list on server SVR, a state of connectedness that reflects whether or not each contact is presently connected to the network can be updated and indicated in the information delivered to device D1 as part of the contacts list information. A special field with a ON/OFF flag or digit may for example indicate whether each of the contacts in the contacts list is currently logged into their network and is therefore possibly reachable by U1. If a contact is off the network or his or her device D2 is not connected, then this can be an indication that user U1 may not be able to initiate a call to that contact. In some specific embodiments, user U1 is prevented from attempting to call other contacts who are not connected to the communication network, for example by "graying out" their identifiers in a display of contacts on device D1. One way that device D1 identifies itself to server SVR is to provide to server SVR a caller ID indicating the source of the call (D1).

To establish a call to another party, or contact, the caller (U1) selects from the contacts list or information corresponding thereto on device D1 one or more callers. User 111 may use a button, wheel, touch screen, touch pad, voice identification circuit and software or other means to scroll or navigate through the contacts list displayed on device D1. User U1 can then select a selected one or more callers from his or her contacts list appearing on device D1. The selected contact is generally in an alphanumeric code form rather than Arabic numerals, the alphanumeric form being a name or abbreviation or handle for the contact. The caller U1 generally does not know the network address of the caller U2. Rather, caller U1 delivers the name of callee U2 (e.g., "Mr. Smith") to the network and server SVR. Server SVR on the network then correlates the alphanumeric code for callee U2 with callee U2's network address using a lookup table, an algorithm, a code, or other conversion or database operation that accomplishes the same or equivalent function.

Once the association has been made at server SVR to identify the network address of caller U2 then server SVR can bridge the call between device D1 and device D2. Device D2 is typically a Voice over IP (VoIP) enabled computer or functionally-similar device. In that case, the communication between server SVR and second device D2 is performed over the IP protocol and usually over the Internet network. With communications utilizing the Internet, one or many intermediate gateways, routers, and bridges may handle and process the communication packets and data flowing to and from the VoIP second device D2.

Note that in the event that a device or a component is required to communicate with more than one type of device using more than one type of protocol, then the device or component may need to establish more than one process or port, each port handling communication with one of the said more than one protocols or ports. So for example, in the case of the servers and gateways SVR and MGW shown in the figure, these devices communicate with at least an IP port and protocol as well as with a telephony (CS/SS7, GPRS/Digital) port and protocol. This aspect is dependent on the construction and arrangement of the components and network(s) employed and is not meant to be a complete description of the nature of the system generally.

Since server SVR generally has information regarding the end points of the communication, it is possible to use server SVR to accomplish a TDM-to-IP or a IP-to-IP or other communications bridging two or more communication ports and associated protocols. Client software running on one or more of the components of the system of the figure may be employed to accomplish the establishment of the communication connection between devices D1 and D2.

Figure 3:
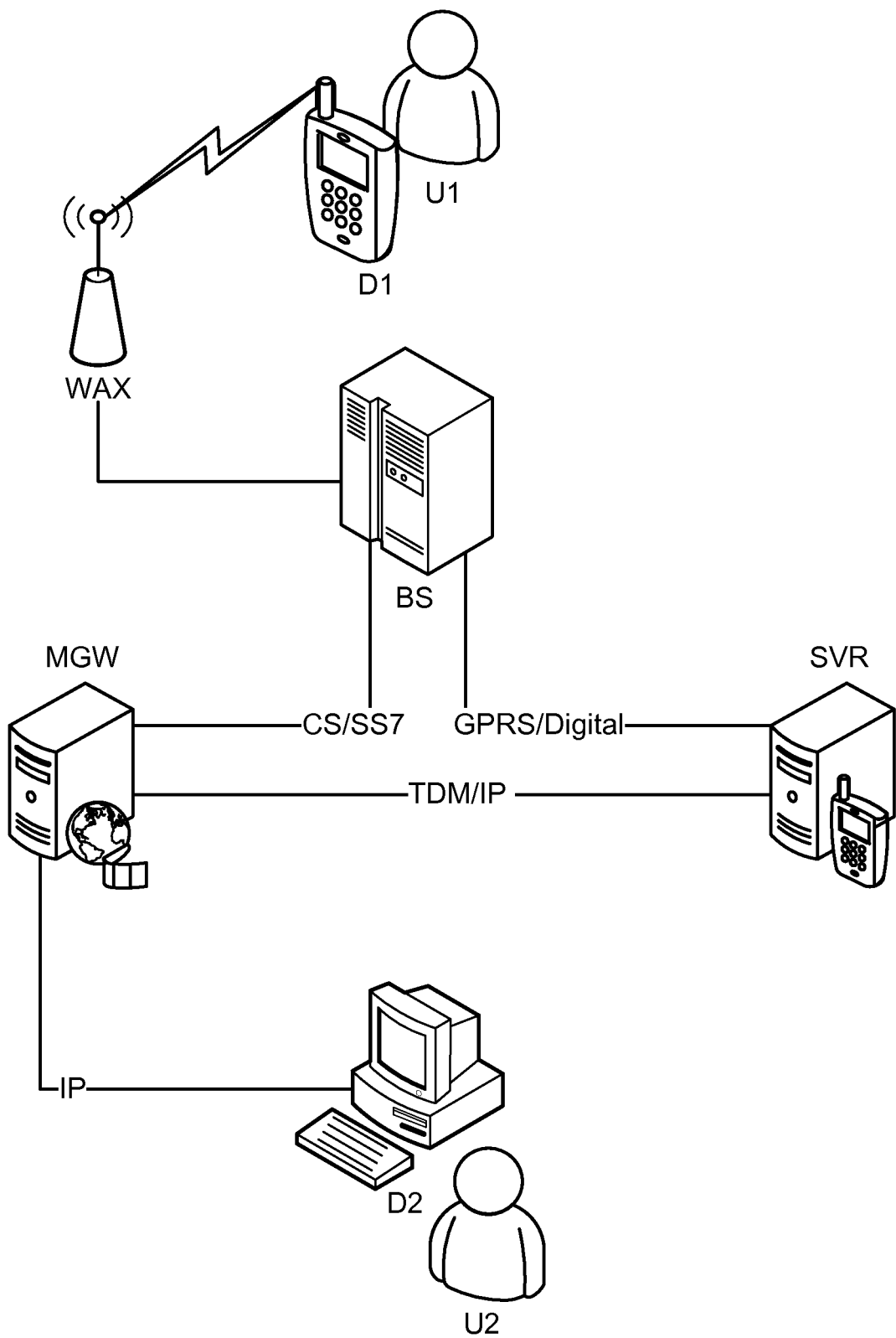
FIG. 3 illustrates another exemplary network and associated communication apparatus for communication between at least a first and a second device.

Now referring to FIG. 3, another exemplary embodiment is illustrated that allows communication between a caller using device D1 and a callee using device D2.

The system of FIG. 3 operates substantially similarly to that of FIG. 2 insofar as the nature of the components, network and protocols used to authenticate the devices and users and insofar as the devices are provided with and maintain contacts lists ("buddy lists") and presence or network presence state information. However, in the embodiment shown in FIG. 3 rather than bridge the voice call information through server SVR, the voice call information (speech data) is sent through the media gateway MGW.

Server SVR in FIG. 3 still looks up or retrieves the contacts list used to determine a network address from the alphanumeric name) information sent by the caller device. However, here server SVR is relieved of the processing and bandwidth overhead of handling the voice communication information. Instead, server SVR is informed of the caller's intent to call a named callee; the server SVR then determining the appropriate callee network address (e.g., IP address) and provides that callee network address to the media gateway MGW. In turn, media gateway MGW, using the received callee network address establishes the voice channel communication between devices D1 and D2.

Figure 4:
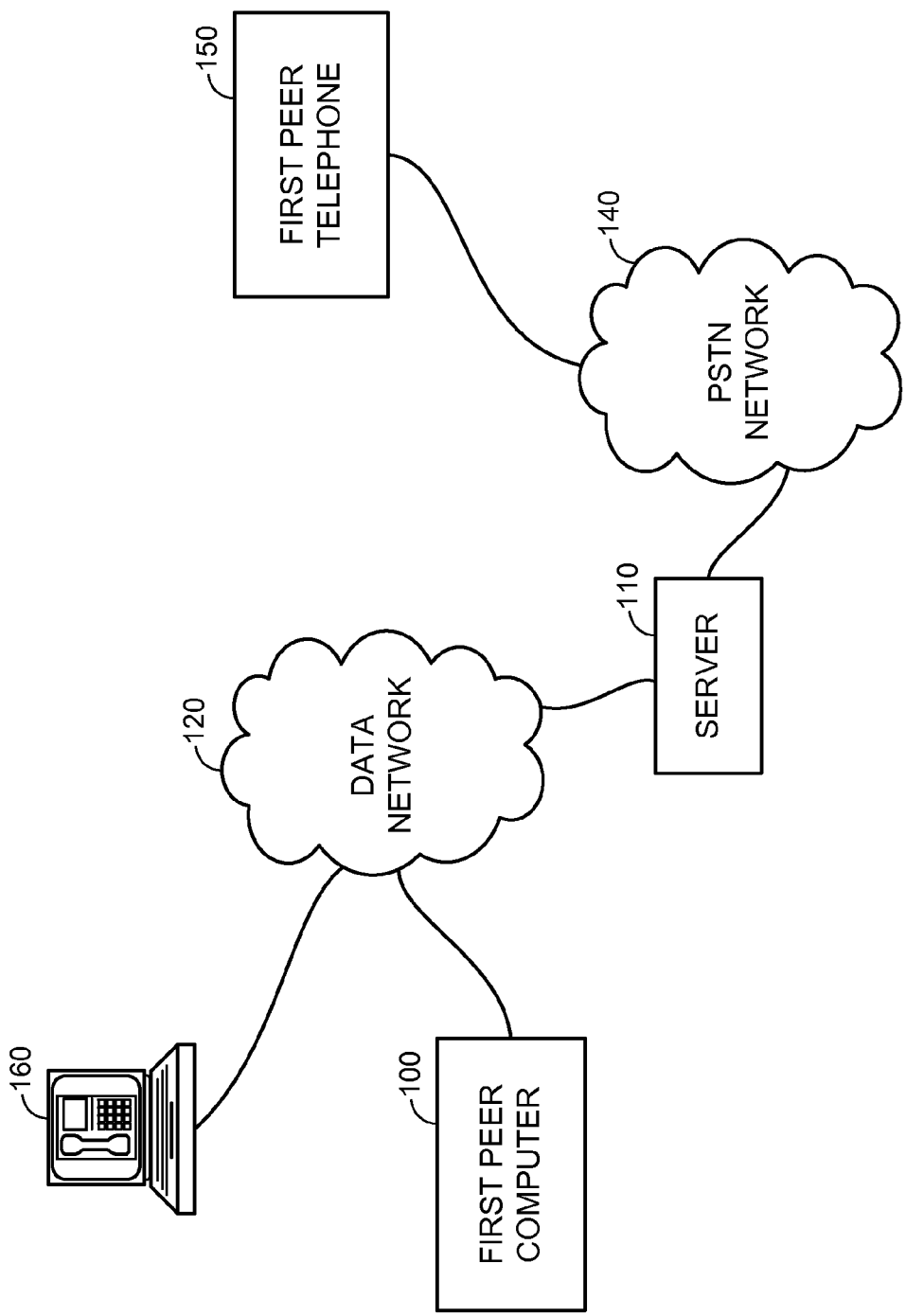
FIG. 4 illustrates an exemplary embodiment for communication between a first peer telephone and a VoIP enabled computer.

FIG. 4 illustrates one system for connecting two communication devices, which can be extended to more than two devices using the same and similar principles as described below. The devices may be considered "peers" and connect two users or subscribers who desire to communicate, e.g. using voice communication. In this embodiment, a first communication device is a telephone adapted for communication over a PSTN network and the second communication device is a computer adapted for communication over a data network using the voice over IP protocol.

A peer communication device is intended to reach any or all types of devices and apparatus constructed to provide communication according to the methods and systems described herein and it is appreciated that various communication infrastructures and protocols exist that can be used as a foundation for such communication. For example one type of peer device is a telephone. Telephones are intended to generally include wired and wireless or mobile or cellular or other types of devices that transmit and/or receive acoustical information such as voice conversation information. Modern telephones that can be adapted for use in the present concept include analog and digital telephones. The telephones can be coupled to a communication network through a twisted wire connection or through a high-speed Internet connection or through a computer or adapter having for example a USB interface to the telephone. The connection may also be established through intermediary adapters, connections, servers, hubs, or switches and routers. For example a cellular telephone device conducts communication with a network by receiving and transmitting signals using wireless radio wave signals to and from a base station coupled to a cellular network of such base stations.

Referring to FIG. 4, First Peer Telephone 150 connects to Server 110 over a PSTN (Network) 140 and establishes a communication with the VoIP enabled computer 160. The connection between First Peer Telephone 150 and Server 110 over PSTN 140 is carried out as specified by various standards created by the ITU-T organization for example, including the E.163/E.164 protocols that specify a telephone number addressing scheme. A typical PSTN leg of the connection involves carrying a digitized (e.g. at 8 kHz) voice signal to and from First Peer Telephone 150 and switching the digitized signal using the Signaling System No. 7 ("SS7") protocol (sometimes called the common channel signaling system No. 7) through the telephone network.

The arrangement illustrated in FIG. 4 permits a telephone user, for example a mobile telephone user of First Peer Telephone device 150, to log into (or log on) Server 110 and be authenticated. The First Peer Telephone 150 may be equipped with the customary digital keypad capable of delivering alphanumeric characters or symbols over the telephone network for such a purpose. For example a user of First Peer Telephone 150 enters a user name and/or a password that can be verified or authenticated by Server 110 which compares the entered authentication or identification information of First Peer Telephone 150 with a set of identification information for known subscribers stored on Server 110 or in a database or lookup table associated therewith. Also, Server 110 may recognize a stored hardware and/of software code or identification information associated with First Peer Telephone 150 such as caller ID, subscriber identity module ("SIM") card for mobile phones, a processor serial ID number of the telephone hardware or a software or firmware license serial number that identifies First Peer Telephone 150 to Server 110.

Once Server 110 has authenticated or recognized the identity of First Peer Telephone 150 Server 110 is prepared to provide communication and related services to First Peer Telephone 150 as described throughout this document and as will be appreciated by those skilled in the art.

One feature and service of Server 110 can be the keeping, updating, maintenance, and serving of Contacts List information to a client. Contacts Lists are known in other contexts and communications applications as a way of keeping a list or table of information relating to one or more Contacts. Contacts can be individual persons or entities or machines that a user or subscriber sometimes wishes to communicate with and does so by accessing the Contacts List to discover and use the information associated with the one or more Contacts being contacted. Contacts Lists generally include a plurality of entries, typically stored on a data storage device such as computer memory or tape or optical media in a data structure such as a database. Contacts and contact information relating to the Contacts may be accessed, deleted, edited, created or searched as needed.

Contact information can include an organized data structure having entries associated with each entity or person (Contact) in the Contacts List. The entries can include contact information such as the Contact's name, telephone number, home and work postal addresses, and specifically in the present context may include one or more network addresses identifying a location on a network at which the Contact may be reached. Still more specifically in the present context, the network address may identify the Contact uniquely. That is a Contact may be associated with a network address that no other entity or machine is associated with. Alternately, a Contact can be a shortcut to contacting a group of individuals, entities or machines such that establishing a communication with such a Contact results in the distribution of the communication to each available member of the group. Alternatively, a Contact can have a network address that is pseudo-unique and can indicate any communication device coupled to a terminal connection associated with the network address. Methods for terminating communication connections vary, sometimes by the nature of the hardware and protocols employed in the specific communication channel.

Another function or service of Server 110 can be to facilitate the establishment or maintain and manage a communication link between two peer devices. For example, Server 110 can establish communication that bridges PSTN 140 and Data Network 120. In some embodiments this is carried out over two communication ports at Server 110, one port for exchanging information with PSTN 140 using a first PSTN-compatible communication protocol such as the SS7, and a second port for exchanging information with Data Network 120 using a second Data Network-compatible communication protocol such as TCP being sometimes a VoIP communication.

The Data Network 120 can be for example the Internet and the second Data Network-compatible communication protocol can be for example the Internet Protocol (IP) or related protocol. Clients or server software running on a processor and executing instructions stored in a computer-readable medium on Server 110 or coupled thereto can implement the communications over the communication ports. Hardware and/or software can be used to couple the communication signals and information included therein between the first (PSTN) Network 140 and the second (Data) Network 120.

According to one or more embodiments, First Peer Telephone 150 receives from Server 110 a full or partial Contacts List or contact information derived therefrom. The contact info anon is indicated on First Peer Telephone 150 in some fashion that allows selection of a particular one or more contacts for communication. For example, the contact information may be displayed on a display screen or other display apparatus on or coupled to First Peer Telephone 150. Typically, a user of First Peer Telephone 150 can see or hear or otherwise perceive the information from the Contacts List as displayed by First Peer Telephone 150. The user can then use a user interface such as a keypad, mouse, joystick, touch screen, voice-activated input or other input device to select one or more contacts from the displayed list with which to establish communication. Likewise, in the case of incoming communications received at First Peer Telephone 150, the user may determine an identity of a caller associated with the Contacts List.

Generally, it can be considered that correlated caller-callee contacts information is kept on the Server 110 in a server contacts list and on First Peer Telephone 150 in a mobile version of the contacts list that is associate therewith.

Server 110 is designed and configured to recognize a connection request signal from First Peer Telephone 150, The connection request includes a contact identifier or information identifying one or more contacts from a Contacts List on Server 110. The connection request signal may be sent to Server 110 from First Peer Telephone 150 by any means of communication established between Server 110 and First Peer Telephone 150, e.g., dual tone multi-frequency ("DTMF") tones transmitted over the voice channel, or out-of-band DTMF tones, or an independent data communication path, or general packet radio service ("GPRS") utilized in conjunction with a synchronizing mechanism as described later. The connection request signal informs a program running on Server 110 that the user of First Peer Telephone 150 wishes to establish a communication with the selected contact or contacts from the Contact List.

Server 110 is also designed and configured to respond to the connection request signal by looking up an address for the selected contact or contacts indicated in the connection request signal. The address is a SIP address in some embodiments and is intended for establishing a SIP communication between at least Server 110 and a voice over IP (VoIP) enabled computer 160. Once Server 110 and the desired VoIP enabled computer 160 are connected over Data Network 120, bridging of communication between First Peer Telephone 150 and VoIP enabled computer 160 through Server 110 can take place. This system and method for connecting the first device (First Peer Telephone 150) and the second device (VoIP enabled computer 160) through Server 110 is generally considered a "direct" connection, although it is understood that several intermediary hardware, software, and network interfaces will typically exist between the above primary components to establish a practical communication connection between the first and second devices as discussed herein and known to those skilled in the art.

Another system and method for connecting the first and second devices, generally referred to as an "indirect" connection can be used as well according to FIG. 4. In these embodiments, Server 110 connects First Peer Telephone 150 to First Peer Computer 100. And First Peer Computer 100 connects to VoIP enabled computer 160. Accordingly, both Server 110 and First Peer Computer 100 are used to establish the communication between First Peer Telephone 150 and VoIP enabled computer 160. Here First Peer Computer 100 may belong to the same entity or user as First Peer Telephone 150 and may contain or have access to codes or data required for establishing a successful communication between the first and second devices.

Figure 5:
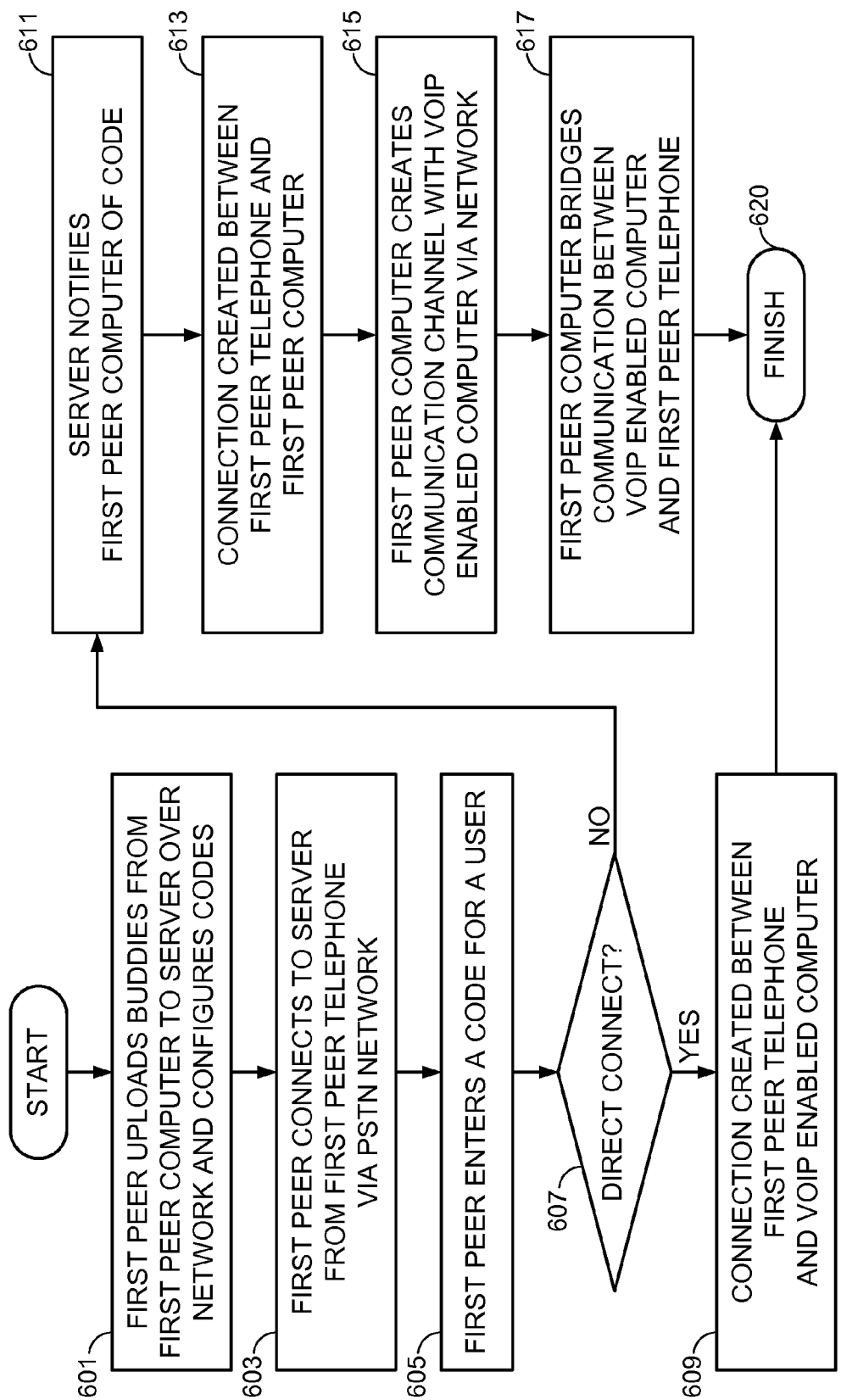
FIG. 5 illustrates an exemplary sequence of steps for communication using the system of FIG. 4.

Establishing communication between the first and second devices can be accomplished by following the steps outlined in the FIG. 5. These steps do not necessarily need to be performed in the same order as that shown, and additional steps may be performed beyond those illustrated in some embodiment, or some of the illustrated steps may be combined or deleted as called for by the specific instance at hand.

In step 601, a user of the First Peer Computer 100 uploads the list of contacts ("buddies") from the First Peer Computer 100 to the Server 110. This list of contacts links the contact's identification information (first name, last name or user handle) with the contact's network address and access code. In one embodiment, the contact's access code is a unique identifier, assigned to each contact. First Peer Computer 100, may be coupled to the network, and coupled to Server 110, and in fact the uploading of the Contact Lists that First Peer Computer 100 performs may be alternately be accomplished using Server 110.

In step 602, the user of the First Peer Telephone 150 sends a contact name and an associated access code, uniquely identifying First Peer Telephone 150, such as a pre-assigned session-ID or in a different embodiment the caller-id, to the Server 110.

In step 603, the user of the First Peer Telephone 150 connects to the Server 110 over the PSTN network 140. When the connection is established, in one embodiment, Server 110 provides the user with a dial tone or a voice menu. In another embodiment, no sound is transmitted, but Server 110 waits in silence for DTMF tones. In yet another embodiment, neither voice menu nor dial tone are provided.

In step 605, the user of the First Peer Telephone 150 sends a contact access code, uniquely identifying the contact, to the Server 110. In an alternate embodiment, the contact access code is determined by analyzing the caller ID identifying First Peer Telephone 150, and the contact name sent in step 602.

In step 607, the Server 110 determines if it can connect to the VoIP enabled computer identified by the contact access code. If such communication is possible, step 609 is performed. If such communication is not possible, step 611 is performed.

In step 609, the Server 110 connects to the VoIP enabled computer 160.

In step 611, the Server 110 forwards the connection request, including the contact access code, to the First Peer Computer 100.

In step 613, the First Peer Computer 100 connects to the First Peer Telephone 150.

In step 615, the First Peer Computer 100, based on the contact access code received, or determined, from the Server 110, connects to the VoIP enabled computer 160.

In step 617, the First Peer Computer 100 bridges the connection between enabled computer 160 and the First Peer Telephone 150.

First Peer Telephone 150 establishes a connection with the Server 110, using the PSTN network. A user of the First Peer Telephone 150, with the help of the software application running on the First Peer Telephone 150 selects a particular contact and sends the contact information to the Server 110.

In one embodiment Server 110 is capable of communicating with members of the PSTN network 140 as well as with the members of the Data Network 120. In this embodiment, Server 110 connects to two devices simultaneously (First Peer Telephone 150 and the VoIP enabled computer 160). Once both connections are established, Server 110 bridges them together, thereby creating a communication channel between a First Peer Telephone 150 and the VoIP enabled computer 160.

In one embodiment, Server 110 receives a contact access code from the First Peer Telephone 150. The Server 110 identifies the user of the First Peer Telephone 150 either by using a caller id or login information, provided by the First Peer Telephone 150. In one embodiment, Server 110 uses the contact access code and the user information to retrieve the contact's record from the contact list database (or any other record keeping system, such as a text file or a spread sheet). Server 110 uses the network address of the VoIP enabled computer 160, stored in the contact record, to establish a communication with this device.

In one embodiment, Server 110 notifies a First Peer Computer 100 that a First Peer Telephone 150 has requested a communication with the contact identified by the contact access code. In this embodiment, Server 110 may also forward the contact access information to the First Peer Computer 100.

In one embodiment, First Peer Computer 100 uses the contact address information to establish a communication with the VoIP enabled computer 160 via the Data Network 120. After the communication with the VoIP enabled computer 160 is established, the First Peer Computer 100 bridges the connection between the VoIP enabled computer 160 and the First Peer Telephone 150.

One aspect of the present invention allows users to integrate multiple contact lists stored on different devices. Generally, contact lists associate contact information (contact name, alias, etc.) with the network address of the contact. For instance, a contact list stored on the cellular phone may associate a contact Joe Smith with the phone number 617-123-1234. Similarly a contact list stored in the VoIP device may associate a contact "Smith" with the Internet Protocol address "66.249.64.15."

Users of VoIP, PSTN and wireless devices generally maintain a separate contact list on each communication device. A contact list stored on one device sometimes cannot be accessed from another. For instance, a contact list stored on the VoIP enabled computer is not accessible by a user of a wireless phone. Similarly, a contact list stored on one VoIP enabled computer 160 is often inaccessible from another VoIP enabled computer. In one embodiment, the contact list information from multiple devices can be combined in a database table with the following fields: USER_ID, CONTACT_ID, CONTACT_NAME, CONTACT_ADDRESS and NETWORK_ID.

By way of example, a USER_ID field uniquely identifies the user that each contact record belongs to. So USER_ID 1 may be associated with CONTACT_ID 1 and CONTACT_ID 2. Similarly, USER_ID 2 may be associated with CONTACT ID 3 and CONTACT_ID 4.

The CONTACT_ID uniquely identifies each contact record. The CONTACT_NAME stores the contact's first and last name information that can be recognized by the user. In other embodiments, this information can be stored in multiple fields, such as CONTACT_FIRST_NAME, CONTACT_LAST_NAME, etc.

The CONTACT_ADDRESS stores the network address of the contact. For example, CONTACT_ID 1 may be associated with a CONTACT_ADDRESS, e.g., 204.167.72.87. Similarly, CONTACT_ID 2 may be associated with a CONTACT_ADDRESS, e.g., 204.167.72.88.

In one embodiment, the format of the CONTACT_ADDRESS is different for each network. For instance, members of PSTN networks are identified by a 3 digit country code+3 digit city area code+7 digit phone number. Members of the VoIP networks are identified by a 12 digit IP address, an email of the user or a special code assigned to the VoIP enabled computer by the VoIP service provider.

The NETWORK_ID information uniquely identifies a physical or virtual network where a contact is located. Generally, a physical network is a collection of devices that communicate with each other over a wire or a radio signal. An example of the physical network would be a PSTN network or a wireless network. A virtual network is a network of interconnected devices that is limited by the membership or protocol rules. In one embodiment, based on the NETWORK_ID, the Server 110 determines the proper way to communicate with the contact.

Server 110 then may be responsible for instructing first peer telephone, in a mode of best communication with the destination. In another embodiment, Server 110 provides this information (e.g., NETWORK_ID) to First Peer Telephone 150, where a supervised decision is made. For example, Server 110 may provide three options; "call Joe on Cell," "call Joe using VoIP," or "call Joe on wireline." Software on First Peer Telephone 150 queries the user of First Peer Telephone 150 to determine which mechanism to use to call Joe]

Figure 6:
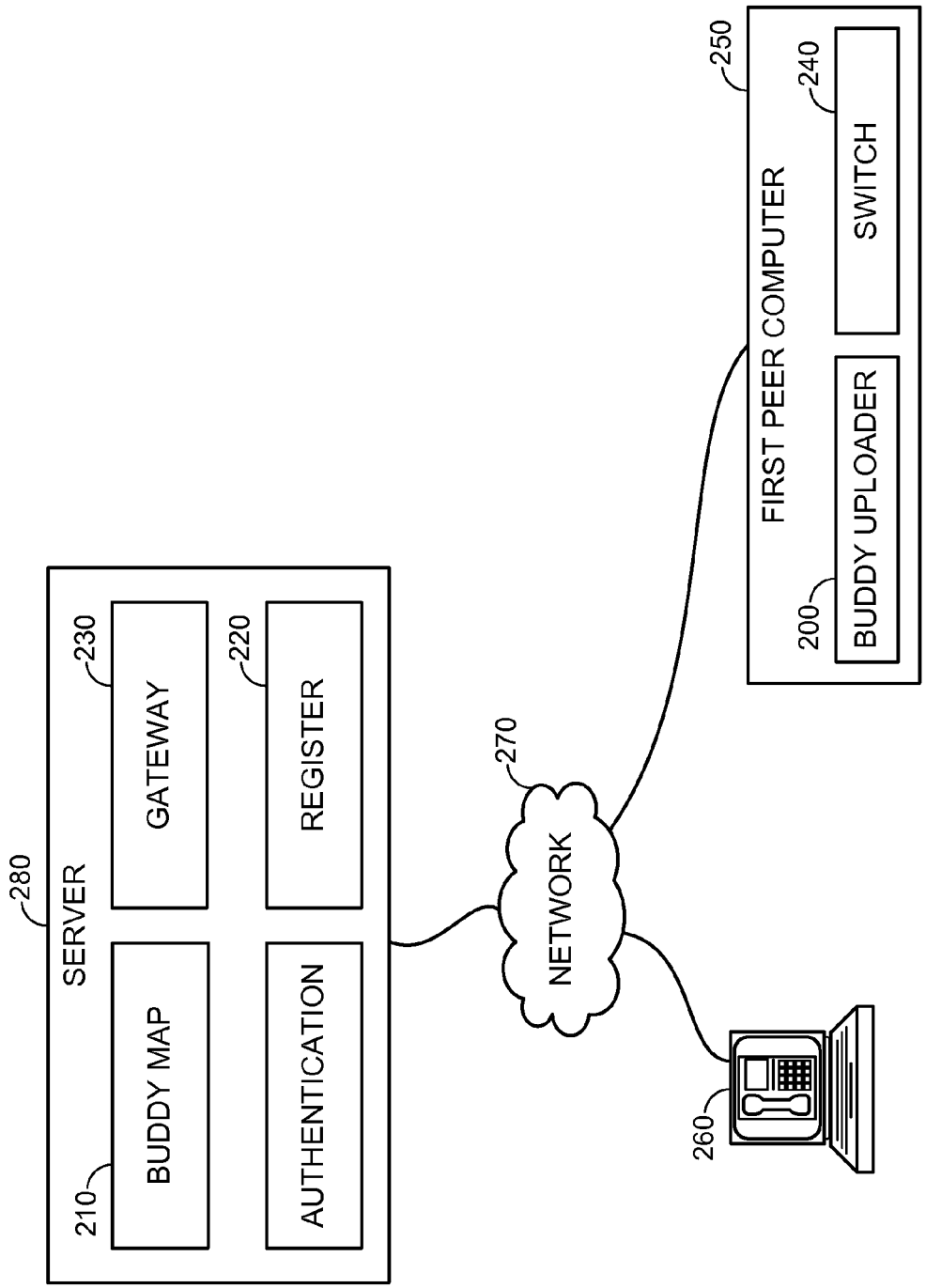
FIG. 6 illustrates an exemplary embodiment of a system with a server having a buddy map and an authentication and registrar modules.

Reference is now made to FIG. 6. Miring the initial setup, a user of the First Peer Computer 250 uploads a contact list of ("buddies") from the First Peer Computer 250. First Peer Computer 250 may be the same as Server 280, the two being merely logically separate, and First Peer Computer 250 may reside in the data network alongside Server 280. Alternatively, it may be physically and geographically remote from Server 280. As a result, a contact address database (the "Buddy Map") 210 on the Server 280 is updated to reflect that a particular user, identified by a unique USER_ID, uploaded a list of contacts, wherein each contact is identified by a CONTACT_ID, each CONTACT_ID is associated with a CONTACT_ADDRESS information, and each CONTACT_ADDRESS information is associated with a particular NETWORK_ID.

In one embodiment, the First Peer Computer 250 runs a Buddy Uploader 200 software application. The Buddy Uploader 200 has access to a list of contacts ("Buddies") This list comprises contact demographic information, such as first and last name, age, mailing address, etc. This list also comprises a network address where a contact can be reached. Depending on the network, the address can be in the form of a phone number, IP address, email, alias, etc. The address can further be associated with a particular communication network where the contact is located.

In another embodiment, the Buddy Uploader 200 imports the contact list from a specific communication application. For instance, the Buddy Uploader 200 can use software interfaces to retrieve the list of "buddies" from various commercially-available voice communication applications.

The Buddy Uploader 200 sends the list of contacts to the Server 280. The contact information can be transferred either by a "push" or "pull" communication technique. For instance, if "push" communication technique is used, the Buddy Uploader 200 establishes a connection with the Server 280 and transfers the list of contacts to the Server 280. If "pull" communication technique is used, the Server 280 is responsible for contacting the First Peer Computer 250 and retrieving the contact list from the First Peer Computer 250.

Updates of the Contacts List, including First Peer Telephone retrieving from the database, via the server, are done in a periodic fashion. The period, i.e. how often an update occurs, is preferably determined by the server. Thus in one embodiment, first peer telephone requests a Contacts List immediately after login, the Contacts List is returned by the Server to First Peer Telephone along with a REFRESH RATE, the REFRESH RATE specifies when First Peer Telephone should next request a buddy list. In this manner the Server can specify that the next refresh should occur at a period different than the previous refresh interval.

The First Peer Computer 250 also has switching functionality 240 that, in one embodiment, forwards the signal from the incoming call to the VoIP enabled computer 260. The switching functionality bridges the communication between the inbound caller (not shown on the figure) and the VoIP enabled computer 260. In one embodiment, the switching functionality is implemented using two different communication interfaces. The first interface is responsible for accepting the incoming connection, which connects the caller to the First Peer Computer 250. The second interface is responsible for establishing the outgoing connection, which connects the First Peer Computer 250 to the VoIP enabled computer 260. After both connections are established, the switching functionality 240 bridges the link between the two.

FIG. 6, also shows a Server 280. In this embodiment, the Server 280 comprises a Buddy Map 210, a Gateway 230 and a Registrar 220. The Buddy Map 210 stores the contact information received from the First Peer Computer 250. The Buddy Map 210 is initially populated by the First Peer Computer 250. In one embodiment, the Buddy Map 210 can be updated by multiple users.

In one embodiment, a Gateway 230 forwards the signal received from the First Peer Computer 250 to the VoIP enabled computer 260. When Gateway 230 receives a call from the First Peer Computer 250, in one embodiment, it authenticates a caller. The authentication can be performed automatically by detecting the caller ID of the First Peer Computer 250. It may also be done manually, by requesting a First Peer Computer 250 to supply a login and password information. In this was Gateway 230 can act as a load-balance and call distribution solution, by directing calls to their appropriate destination based on the caller and callee information as available.

In another embodiment, a Gateway 230 determines whether it can establish a connection with the VoIP Enabled Computer 260 based on the information stored in the Registrar 220. In one embodiment, this information comprises a list of contacts who can currently accept a phone call. The Registrar 220 information can be updated based on a request from the VoIP Enabled Computer 260.

Figure 7:
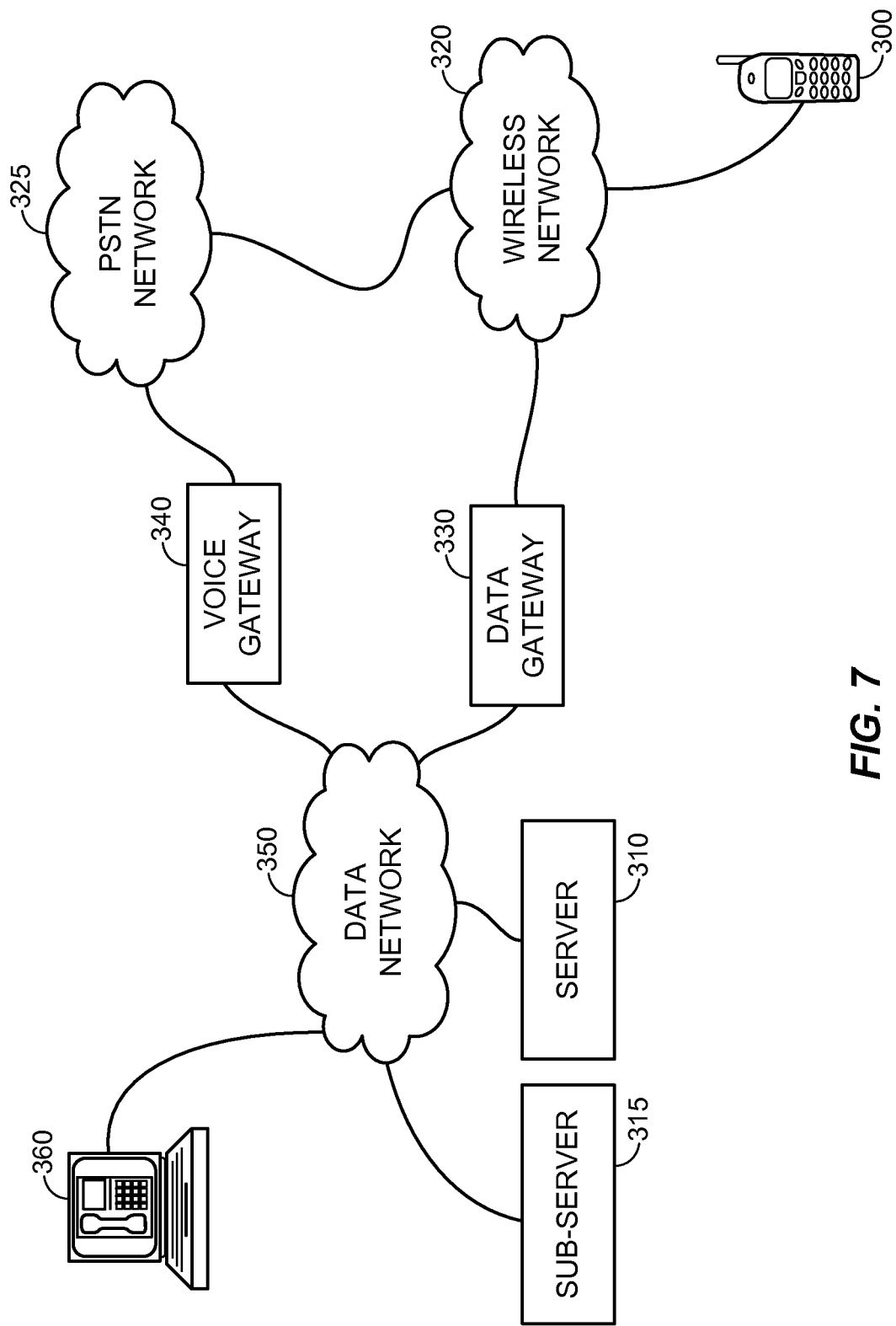
FIG. 7 illustrates an exemplary embodiment of a system having a server and a sub-server.

FIG. 7 shows a system comprising a Remote Cellphone 300, connected to the wireless network 320. Wireless Network 320 connected to the PSTN Network 325. PSTN Network 325 connected to a Data Network 350, using a Voice Gateway 340. Wireless Network 320 connected to the Data Network 350, using the Data Gateway 330. In one embodiment, the Data Network 350 also connects Server 310 with a Sub-Server 315 and a VoIP Enabled Computer 360.

In one embodiment, devices residing on wireless network 320 can access devices residing on Data Network 350 by using two different gateways: a Data Gateway 330 and a Voice Gateway 340.

The Data Gateway 330 provides a fast and secure way to transfer information between the Remote Cellphone 300 and the Server 310. For example, Remote Cellphone 300 uses the Data Gateway 330 to send the user login information to the Server 310. In one embodiment, Server 310 authenticates the user by matching the received user information to the list of users authorized to access the Server 310. If the authentication is successful, Server 310 sends a contact list, associated with the user to the Remote Cellphone 300. Remote Cellphone 300 displays a list of contacts to the user and the user selects a particular contact the user wants to call to.

In one embodiment, the Voice Gateway 340 is used by the Remote Cellphone 300 for transmitting, over the PSTN network 325, a connection request and the selected contact information to the Server 310. The Server 310 may respond to the connection request with a dial tone or a menu, such as is well known in the art of the interactive voice response systems (IVR).

In one embodiment, the Server 310 maps the received selected contact information to the address of the associated VoIP enabled computer 360 and determines if the VoIP enabled computer 360 is accessible from the Server 310. If so, Server 310 connects to the VoIP enabled computer 360 and bridges the connection between the VoIP enabled computer 360 and the Remote Cellphone 300.

In one embodiment, Server 310 delegates the connection management services to the Sub-Server 315. The Server 310 forwards the communication request and the selected contact information to the Sub-Server 315. In one embodiment, the Sub-Server is selected based on the destination contact information. For example, destination contacts that reside in one geographical area are contacted using one Sub-Server, while destination contacts residing in another geographical area are contacted using another Sub-Server.

In one or more embodiments, the communication request from the Remote Cellphone 300 is uniquely identified by the Session ID information. A Session ID information identifies a particular connection request by a particular user. If the same communication device connects to the Server 310 multiple times, a different Session ID is generated for each connection. In some embodiments, the connection request can be identified by a combination of the Session ID and USER_ID information.

In yet other embodiments, the Remote Cellphone 300 transmits to the Server 310 a correlate string, which comprises a selected contact and session information. The selected contact information, in one embodiment, is represented by the unique identifier of the selected contact. The session information, in one embodiment, can be retrieved from the Server 310, using the Data Gateway 330. In other embodiments, the session information can be generated on the Remote Cellphone 300.

Figure 8:
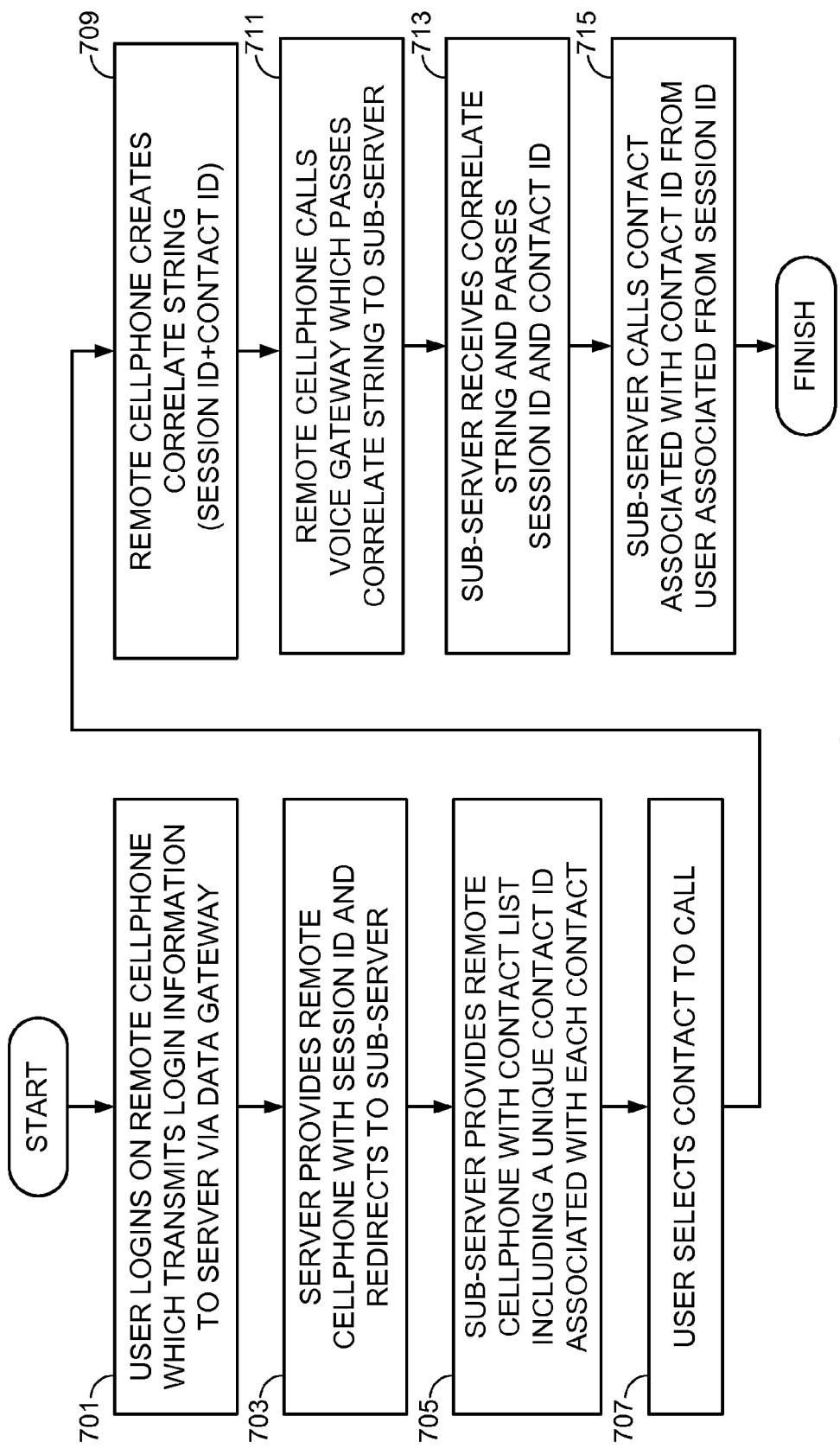
FIG. 8 illustrates an exemplary sequence of steps for communication using the system of FIG. 7.

FIG. 8 shows a method for using the system shown in FIG. 7 according to one or more exemplary embodiments.

In step 701, the user sends the login information from the Remote Cellphone 300 to the Server 310 via a Data Gateway 330.

In step 703, the Server 310 redirects to a Sub Server 315. In step 704 the Sub Server 315 provides the Remote Cellphone 300 with a Session ID.

In step 705, the Sub-Server 315 sends the contact list, including a unique contact id associated with each contact, along with the session ID and a refresh rate, to the Remote Cellphone 300.

In optional step 706, Remote Cellphone performs periodic refreshes of the contact list as specified in the 'refresh rate' returned by Sub-server 315

In step 707, the contact list is presented to the user of the Remote Cellphone 300. The user of the Remote Cellphone 300 uses the buttons of the phone and selects a contact to call.

In step 709, the software running on the Remote Cellphone 300 creates a string that comprises a Session ID received from the Server 310 and a unique contact id of the contact selected by the user.

In step 711, the Remote Cellphone 300 connects to the Data Gateway 340, which passes the correlate string to the Sub Server 315.

In step 713, the Sub Server 315 receives the correlate string and extracts the Session ID and the unique Contact ID information.

In step 715, the Sub Server 315 uses the unique Contact ID (CONTACT_ID) and the Session ID to determine the network address of the Contact that the user is trying to reach.

In Step 716, Remote Cellphone 300 creates a Voice Channel to Sub-Server and, the Sub-Server 315 connects to the contact.

Figure 9:
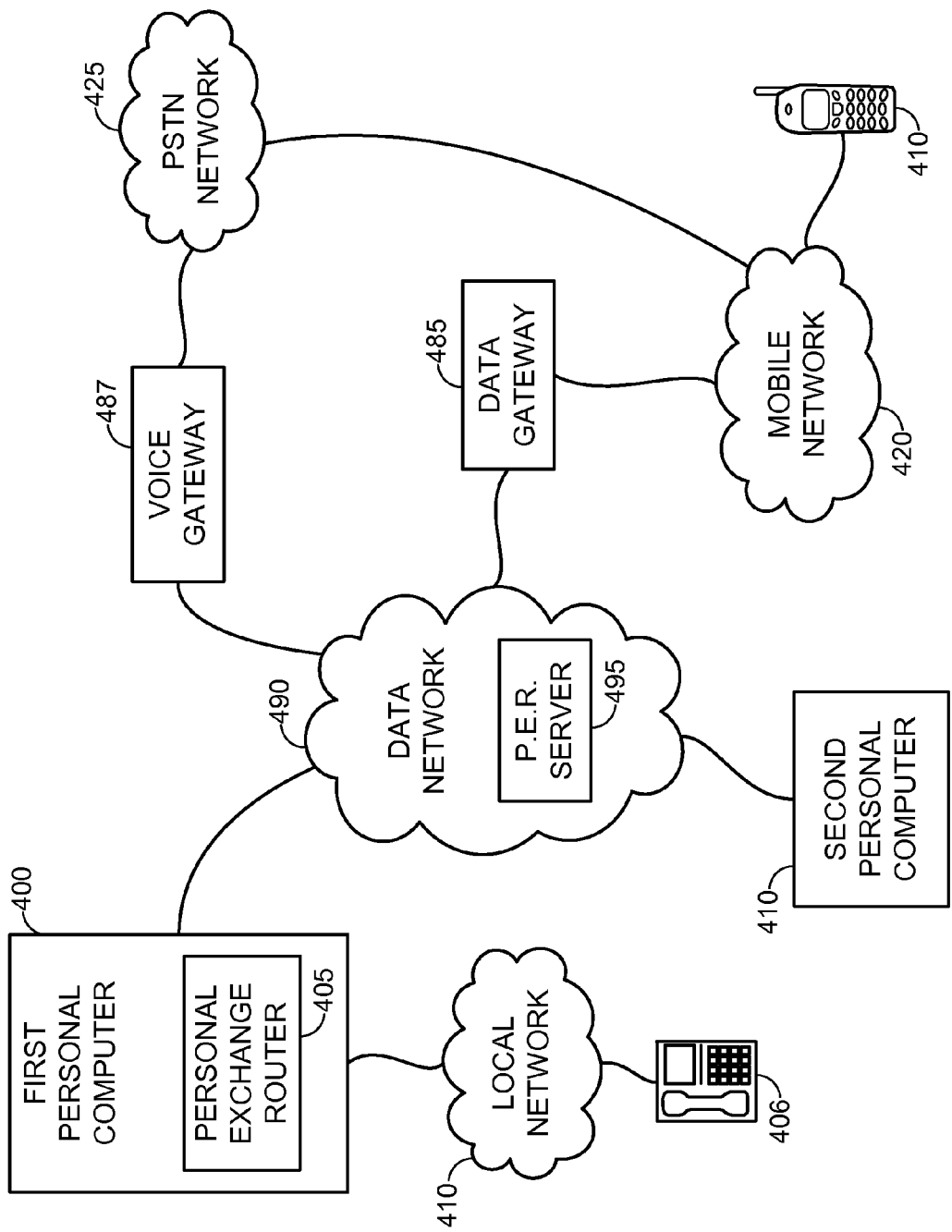
FIG. 9 illustrates an exemplary embodiment of a system having a personal computer and a personal exchange router.

FIG. 9 illustrates another exemplary embodiment of the present invention that employs a Personal Exchange Router 405, capable of switching and routing communication traffic between two or more networks. For example, the Personal Exchange Router 406 may switch the signal received from the Remote Cellphone 410 to a phone, connected on a local network, such as a Bluetooth Phone 406.

The connection from the Remote Cellphone 410 to the Bluetooth Phone 406 is established based on a short code transmitted from the Remote Cellphone 410 to the Personal Exchange Server 495. In one embodiment, the Personal Exchange Server 495 forwards the signal to the Personal Exchange Router 405 that uses the Interactive Voice Response (IVR) system to identify a short code associated with the Bluetooth Phone 406.

Figure 10:
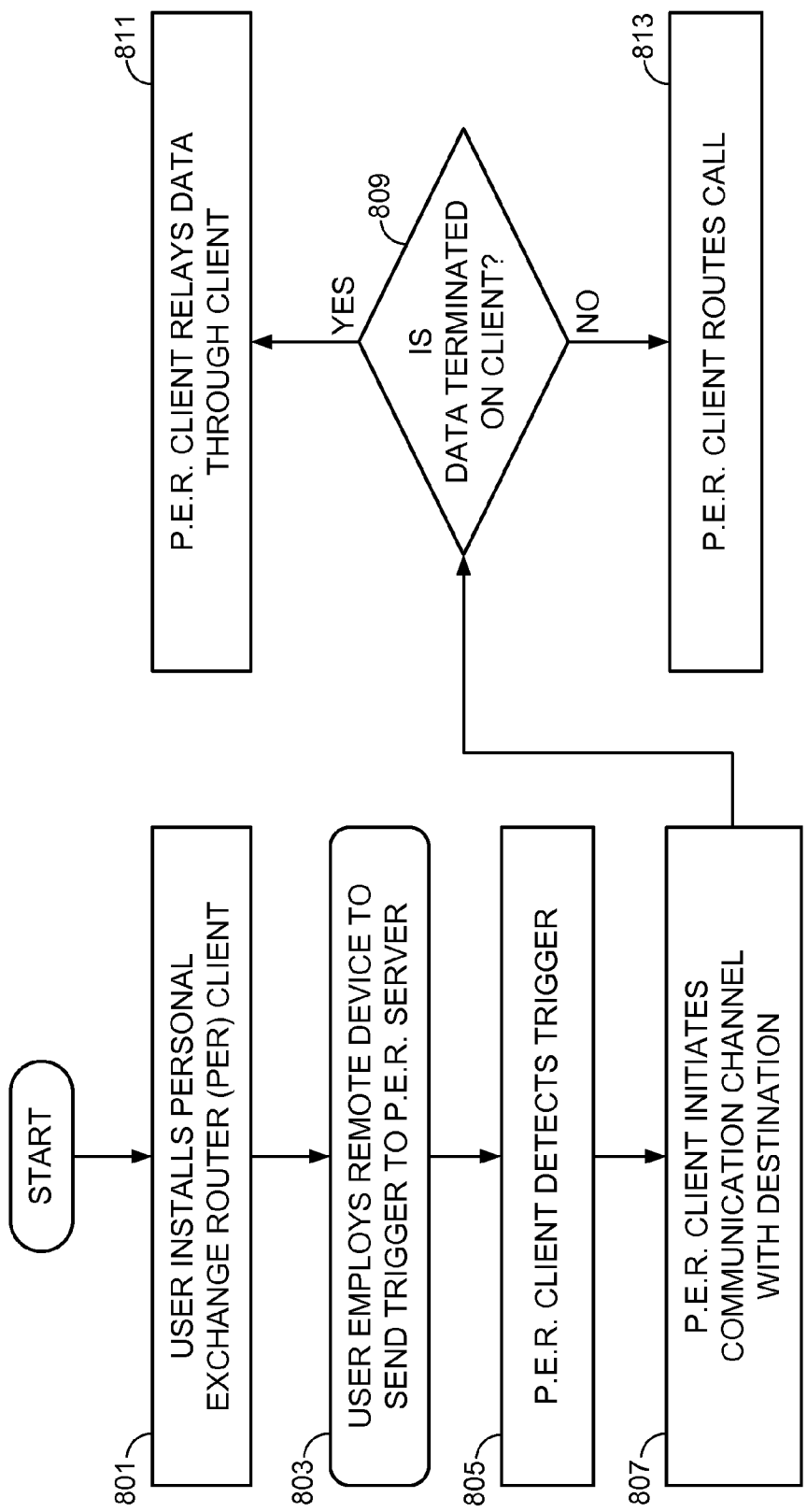
FIG. 10 illustrates an exemplary sequence of steps for communication using the system of FIG. 9.

FIG. 10 shows a method for using a one embodiment of the system shown on FIG. 9 according to one or more exemplary embodiments.

In step 801, the user installs the Personal Exchange Router 405 software on the First Personal Computer 400.

In step 803, the user employs a remote device, such as a Remote Cellphone 410, to send a trigger to the Personal Exchange Server 495.

In step 805, the Personal Exchange Router 405 detects the trigger sent to the Personal Exchange Server 495 by the Remote Cellphone 410.

In step 807, the Personal Exchange Router 405 initiates the communication with the destination device (the Bluetooth Phone 406), identified by the short code.

In step 809, the Personal Exchange Router 405 determines if the call is targeted to the First Personal Computer 400.

In step 811, the digital audio signal received from the Remote Cellphone 410 is converted to the analog and outputted using an audio output device.

In step 813, the signal is forwarded to the Bluetooth Phone 406.

Figure 11:
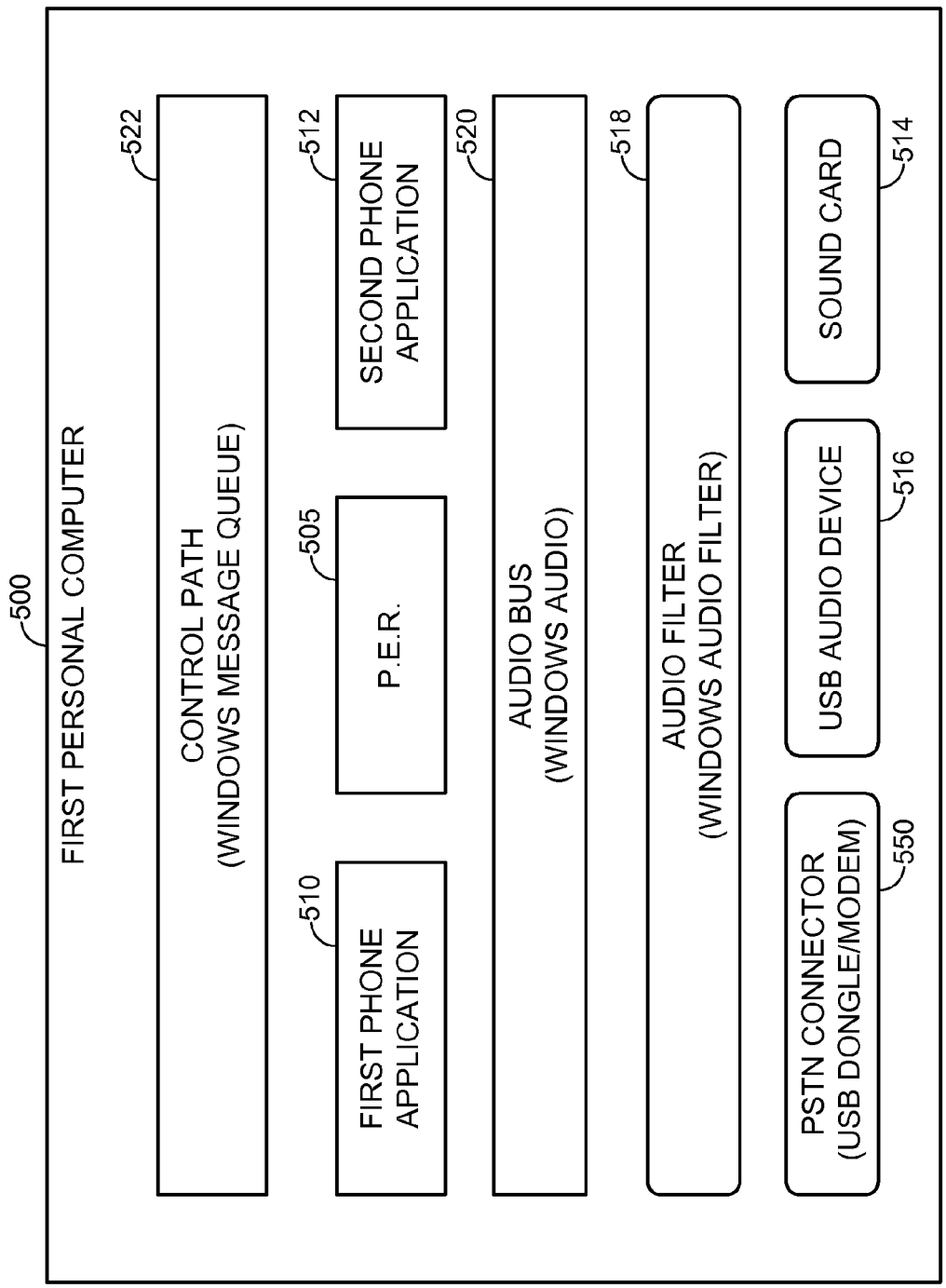
FIG. 11 illustrates exemplary components of a personal computer system according to one or more embodiments described herein.

FIG. 11 shows one embodiment of the First Personal Computer 500 that runs the Personal Exchange Router application (505) and also processes the audio signal. In one embodiment, the audio signal is processed with help of the Audio Bus 520, Audio Filter 518, Sound Card 514 and USB Audio Device 516.

In one embodiment, the Personal Exchange Router 505 can simultaneously communicate with multiple voice networks. For example, it may connect a USB phone to one or more phone applications.

In one embodiment, the First Personal Computer 500 uses the Audio Bus 520 to bridge the voice connection between the First Phone Application 510 and the Second Phone Application 512. This functionality can be implemented by, for example, using the steps outlined in FIG. 12.

Figure 12:
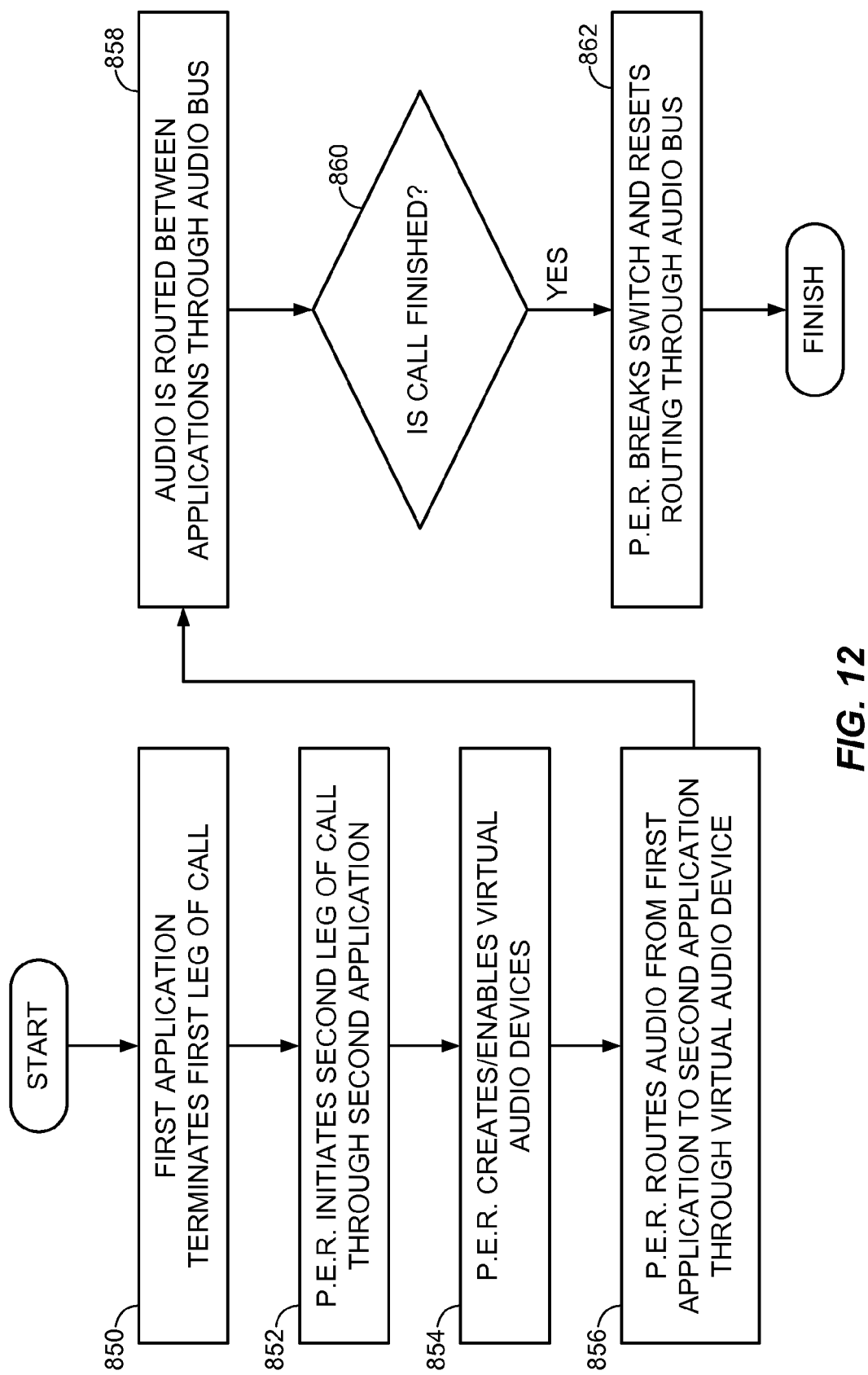
FIG. 12 illustrates an exemplary sequence of steps for communication according to one or more embodiments described herein.

FIG. 12 provides an example of a method for relaying the audio data at the First Personal Computer 500 according to one or more exemplary embodiments.

In step 850, First Phone Application 510 establishes a first phone connection.

In step 852, the Personal Exchanger Router 505 initiates a second phone connection via a Second Phone Application 512.

In step 854, the Personal Exchanger Router 505 configures virtual audio devices, such as an Audio Bus 520.

In step 856 and 858, the Personal Exchange Router 505 uses the Audio Bus to forward the audio signal from the First Phone Application 510 to the Second Phone Application 512.

In step 860, the Personal Exchange Router 505 keeps monitoring both phone connections.

In step 862, when either of the two connections terminates, the Personal Exchange Router 505 resets the call routing.

In one embodiment, the Personal Exchange Router 505 also supports the conference call functionality. The conference calls can be setup, for example, by following the steps outlined on the FIG. 13.

Figure 14:
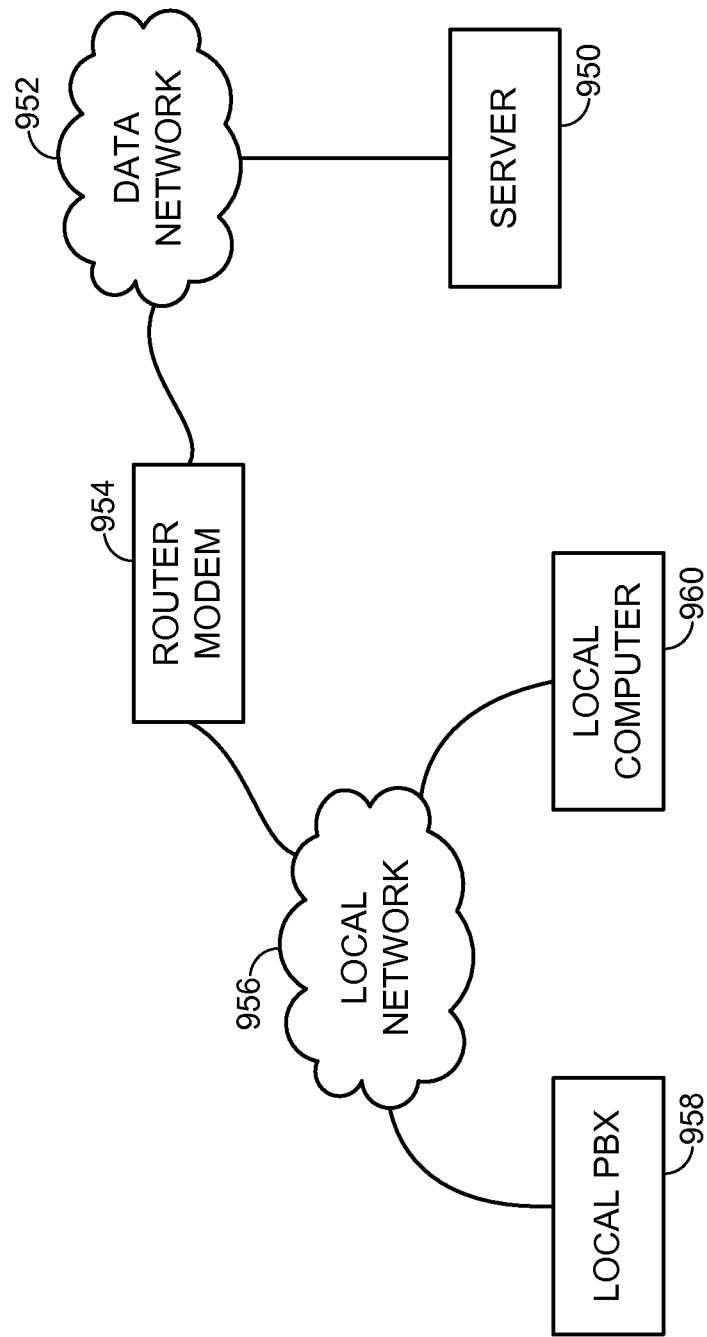
FIG. 14 illustrates an exemplary embodiment of a system for communication using a local network coupled to a local computer and a local PBX.

FIG. 14 shows another aspect of the present invention. The Server 950 is connected to a Data Network 952. The Data Network 952 is connected to a Router Modem 954. The Router Modem 954 is connected to a Local Network 956. The Local Network 956 is also connected to a Local PBX 958 and Local Computer 960. A Local Network 956, in one embodiment, represents a home wireless network. A Local Computer 960 runs a software application that communicates with a software application running on the Local PBX 958 via the Local Network 956.

In one embodiment, Local PBX 958 provides a termination point for one or more voice networks, thereby making the Local PBX 958 available to communicate with each network. In one aspect of the present invention, the Local PBX 958 is provided with a network identifier, such as a phone number. Other members of the network may access the Local Network 956 by using this phone number.

Local PBX 958 may be provided with a set of authorized phone numbers. Each number may be assigned a set of privileges, such as accessing a voicemail, a particular network or any other service provided by the Local PBX 958.

Local PBX 958 forwards calls initiated by a voice communication device with access to the Local PBX 958, such as a Local Computer 960, using a specific communication network. In one embodiment, the choice of the network is based on the area code of the targeted phone number. For example, phone calls to the phone number starting from 617 are initiated using a first network, phone calls to the phone number starting from 718 are initiated using a second network.

Figure 15:
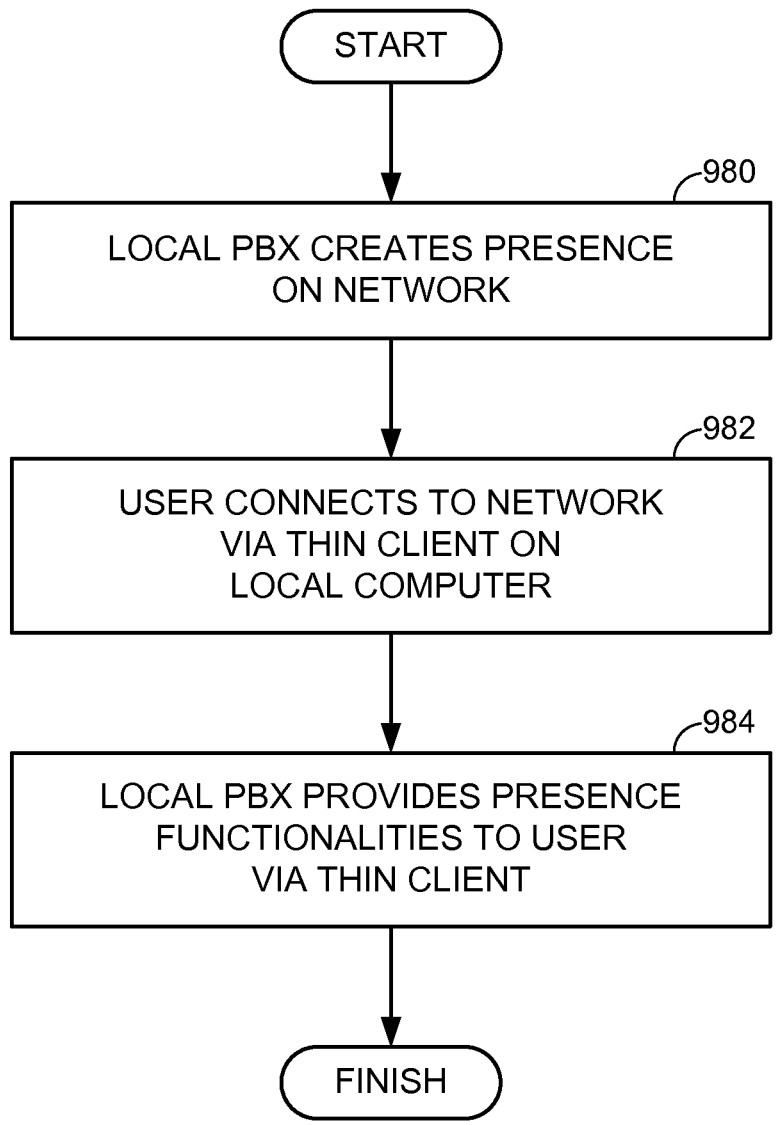
FIG. 15 illustrates an exemplary sequence of steps for communication using the system of FIG. 14.

FIG. 15 illustrates one example of using the Local PBX 958 according to one or more exemplary embodiments.

In step 980, a Local PBX 958 establishes presence on multiple voice networks by, for example, notifying the voice communication service providers that Local PBX 958 is ready to accept calls.

In step 982, a user connects to the Local PBX 958 by using a thin-client application (not shown). In one embodiment, a thin-client application is a user interface that accepts user commands and sends them over a Local Network 956 to the Local PBX 958. For example, a thin-client application may be implemented using the HTML browser. The HTML browser accepts user's commands and forwards them to the Local PBX 958.

In step 984, Local PBX 958 receives a communication signal from a single point, such as a thin-client, running on the Local Computer 960. Based on this communication request, in one embodiment, it notifies all communication networks that a user is available to accept calls.

Various embodiments described herein provide one or more of the following capabilities, which are discussed for illustrative purposes and are not limiting, but can be appreciated by those skilled in the art.

These and other capabilities of the invention, along with the invention itself, will be more fully understood after a review of the following figures, detailed description, and claims.

This implementation is exemplary, however, and not limiting of the invention as other implementations in accordance with the disclosure are possible.

In operation, referring to FIG. 5 a process for correlating a caller with a callee using the system described herein includes the stages shown. This process, however, is exemplary only and not limiting. The process on FIG. 5 may be altered, e.g., by having stages added, removed, or rearranged.

In operation, referring to FIG. 10 a process for correlating a caller with a callee using the system described herein includes the stages shown. This process, however, is exemplary only and not limiting. The process on FIG. 10 may be altered, e.g., by having stages added, removed, or rearranged.

In operation, referring to FIG. 12 a process for correlating a caller with a callee using the system described herein includes the stages shown. This process, however, is exemplary only and not limiting. The process on FIG. 12 may be altered, e.g., by having stages added, removed, or rearranged.

Figure 13:
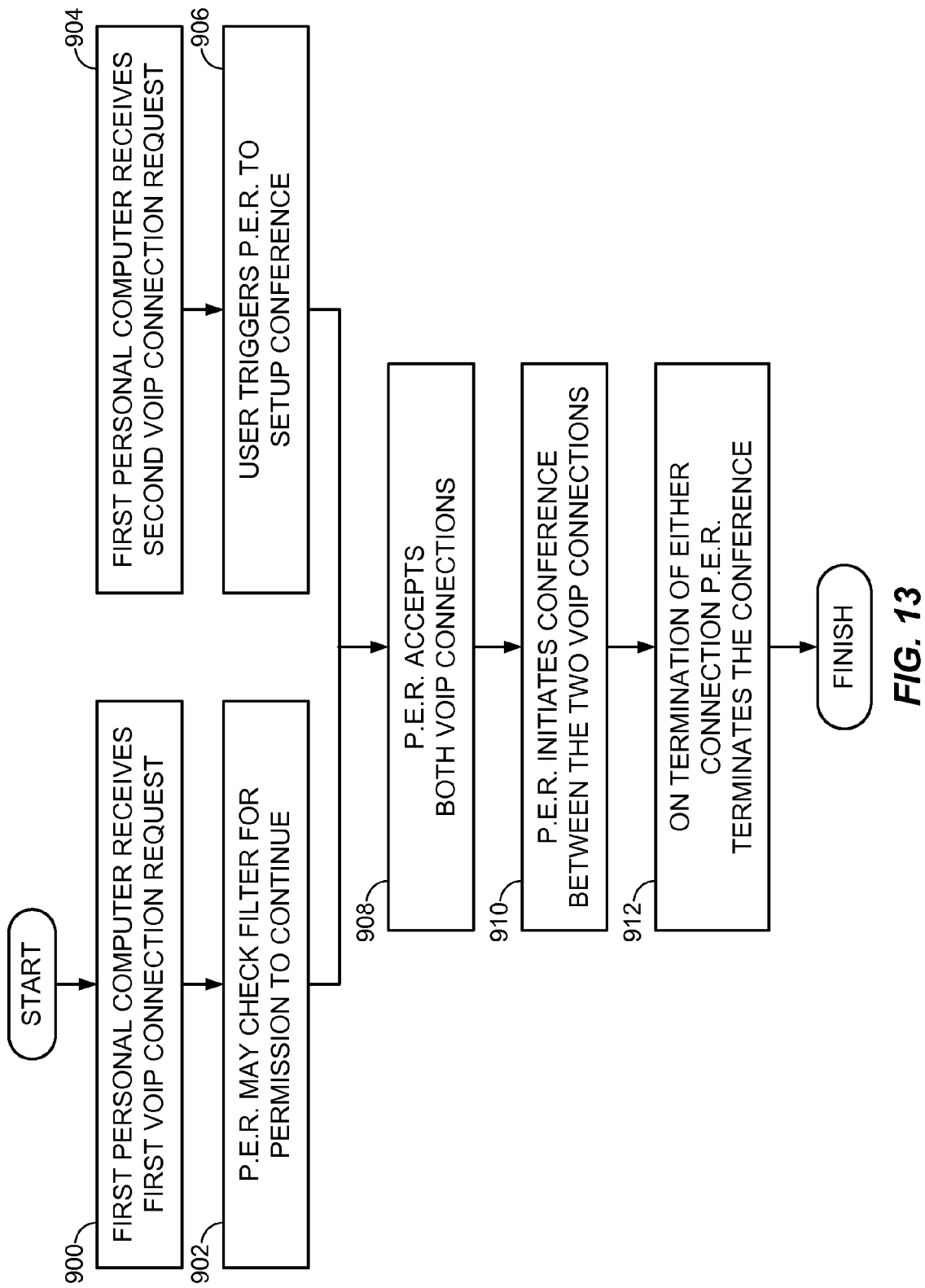
FIG. 13 illustrates an exemplary sequence of steps for communication according to yet other embodiments described herein.

In operation, referring to FIG. 13 a process for correlating a caller with a callee using the system described herein includes the stages shown. This process, however, is exemplary only and not limiting. The process on FIG. 13 may be altered, e.g., by having stages added, removed, or rearranged.

In operation, referring to FIG. 15 a process for correlating a caller with a callee using the system described herein includes the stages shown. This process, however, is exemplary only and not limiting. The process on FIG. 15 may be altered, e.g., by having stages added, removed, or rearranged.

In some embodiments of the above, an alphanumeric code may be used to identify one or more of the caller or the callee. The alphanumeric code can be any of the ASCII character set or a combination of a plurality of characters from the ASCII set. The alphanumeric code can be limited to the alphabetical characters "A" through "Z" or a subset thereof and a plurality of alphabetical characters. In other embodiments the alphanumeric code can include a plurality of characters from the alphabetical range "A" through "Z" and also the number range of integers "0" (zero) through "9."

In other embodiments, a third (or fourth) server may be used to serve address or state presence information. For example a server that includes dynamic IP or network contact information or includes dynamic presence state information can be used to provide such information to the other servers or devices.

Also, in addition to communication between a mobile (telephone) and a computer device, the present systems and methods apply to communication between two mobile devices such as two cellular telephones.

The state information includes network presence (availability) and can indicate the actual possibility of communicating with a present and connected device, as well as state information that is derived from a permission state set by a user of a device. The permission state can indicate the user's desire to be contacted or communicate or not, and may be dependent on the caller's identity.

Other embodiments are within the scope and spirit of the invention. For example, due to the nature of software, functions described above can be implemented using software, hardware, firmware, hardwiring, or combinations of any of these. Features implementing functions may also be physically located at various locations, including being distributed such that portions of functions are implemented at different physical locations.

What is claimed is:

1. A method of operating a server configured to selectively bridge communication between a first device and a second device, comprising:
   receiving, from the first device, a request for the server to initiate a voice communication session with the second device by directly bridging communication between the first device and the second device;
   determining that the server cannot bridge the communication between the first device and the second device as requested;
   obtaining a given contact identifier that identifies the second device; and
   providing, to the first device in response to the determination, the given contact identifier to the first device to facilitate the first device to initiate communication with the second device independently of the server.

2. The method of claim 1,
   wherein the request is received over a public switched telephone network (PSTN) from a peer telephone module on the first device that is configured to manage PSTN calls,
   wherein the request requests the server to directly bridge the communication using a PSTN link between the server and the first device and a Voice over Internet Protocol (VoIP) link between the server and the second device,
   wherein the providing provides the given contact identifier is provided to a peer computer module on the first device that is configured to manage VoIP calls, and
   wherein the given contact identifier is provided to the peer computer module to trigger the peer computer module to initiate a VoIP session with the second device independently of the server and the PSTN.

3. The method of claim 1, further comprising:
   obtaining a contact list that includes a set of contacts for a user of the first device, a network address for each contact in the set of contacts and a contact identifier for each contact in the set of contacts that uniquely identifies the associated contact.

4. The method of claim 3, wherein the contact list is obtained from the first device.

5. The method of claim 3,
   wherein the given contact identifier is obtained from the request,
   wherein the given contact identifier identifies a given contact in the set of contacts that is associated with a given network address assigned to the second device, and
   wherein the determination that the server cannot bridge the communication between the first device and the second device as requested is based on detection of an unsuccessful attempt by the server to connect to the second device using the given network address.

6. The method of claim 3,
   wherein the contact list is obtained from a peer computer module provisioned on the first device that is configured to manage Voice over Internet Protocol (VoIP) calls,
   wherein the request is received from a peer telephone module provisioned on the first device over a public switched telephone network (PSTN),
   wherein the contact list includes a given identifier for the peer telephone module,
   wherein the request includes the given identifier for the peer telephone module, and
   wherein the contact list for the user of the first device is determined from the given identifier for the peer telephone module that is included in the request.

7. A method of operating a first device that is attempting to communicate with a second device, comprising:
   transmitting a request for a server to initiate a voice communication session with the second device by directly bridging communication between the first device and the second device on behalf of the first device;
   receiving, from the server in response to a determination that the server cannot bridge the communication between the first device and the second device as requested, a given contact identifier that identifies the second device;
   identifying a network address of the second device using the given contact identifier; and
   attempting to initiate communication with the second device using the identified network address independently of the server.

8. The method of claim 7,
   wherein the request is transmitted over a public switched telephone network (PSTN) from a peer telephone module on the first device that is configured to manage PSTN calls,
   wherein the request is configured to request the server to directly bridge the communication using a PSTN link between the server and the first device and a Voice over Internet Protocol (VoIP) link between the server and the second device,
   wherein the given contact identifier is received by a peer computer module on the first device that is configured to manage VoIP calls, and
   wherein the receipt of the given contact identifier triggers the peer computer module to initiate a VoIP session with the second device independently of the server and the PSTN.

9. The method of claim 7, further comprising:
   uploading, to the server, a contact list that includes a set of contacts for a user of the first device, a network address for each contact in the set of contacts and a contact identifier for each contact in the set of contacts that uniquely identifies the associated contact.

10. The method of claim 9,
wherein the given contact identifier identifies a given contact in the set of contacts that is associated with a given network address assigned to the second device, and
wherein the identifying identifies the network address as the given network address assigned to the second device.

11. The method of claim 9,
wherein the contact list is uploaded from the first device to the server by a peer computer module provisioned on the first device that is configured to manage Voice over Internet Protocol (VoIP) calls,
wherein the request is transmitted from the first device to the server by a peer telephone module provisioned on the first device over a public switched telephone network (PSTN),
wherein the contact list includes a given identifier for the peer telephone module, and
wherein the request includes the given identifier for the peer telephone module.

12. A server configured to selectively bridge communication between a first device and a second device, comprising:
means for receiving, from the first device, a request for the server to initiate a voice communication session with the second device by directly bridging communication between the first device and the second device;
means for determining that the server cannot bridge the communication between the first device and the second device as requested;
means for obtaining a given contact identifier that identifies the second device; and
means for providing, to the first device in response to the determination, the given contact identifier to the first device to facilitate the first device to initiate communication with the second device independently of the server.

13. A first device that is attempting to communicate with a second device, comprising:
means for transmitting a request for a server to initiate a voice communication session with the second device by directly bridging communication between the first device and the second device on behalf of the first device;
means for receiving, from the server in response to a determination that the server cannot bridge the communication between the first device and the second device as requested, a given contact identifier that identifies the second device;
means for identifying a network address of the second device using the given contact identifier; and
means for attempting to initiate communication with the second device using the identified network address independently of the server.

14. A server configured to selectively bridge communication between a first device and a second device, comprising:
a processor coupled to a communication port and configured to:
receive, from the first device, a request for the server to initiate a voice communication session with the second device by directly bridging communication between the first device and the second device;
determine that the server cannot bridge the communication between the first device and the second device as requested;
obtain a given contact identifier that identifies the second device; and
provide, to the first device in response to the determination, the given contact identifier to the first device to facilitate the first device to initiate communication with the second device independently of the server.

15. A first device that is attempting to communicate with a second device, comprising:
a processor coupled to a communication port and configured to:
transmit a request for a server to initiate a voice communication session with the second device by directly bridging communication between the first device and the second device on behalf of the first device;
receive, from the server in response to a determination that the server cannot bridge the communication between the first device and the second device as requested, a given contact identifier that identifies the second device;
identify a network address of the second device using the given contact identifier; and
attempt to initiate communication with the second device using the identified network address independently of the server.

16. A non-transitory computer-readable medium containing instructions stored thereon, which, when executed by a server configured to selectively bridge communication between a first device and a second device, cause the server to perform operations, the instructions comprising:
at least one instruction for causing the server to receive, from the first device, a request for the server to initiate a voice communication session with the second device by directly bridging communication between the first device and the second device;
at least one instruction for causing the server to determine that the server cannot bridge the communication between the first device and the second device as requested;
at least one instruction for causing the server to obtain a given contact identifier that identifies the second device; and
at least one instruction for causing the server to provide, to the first device in response to the determination, the given contact identifier to the first device to facilitate the first device to initiate communication with the second device independently of the server.

17. A non-transitory computer-readable medium containing instructions stored thereon, which, when executed by a first device that is attempting to communicate with a second device, cause the first device to perform operations, the instructions comprising:
at least one instruction for causing the first device to transmit a request for a server to initiate a voice communication session with the second device by directly bridging communication between the first device and the second device on behalf of the first device;
at least one instruction for causing the first device to receive, from the server in response to a determination that the server cannot bridge the communication between the first device and the second device as requested, a given contact identifier that identifies the second device;
at least one instruction for causing the first device to identify a network address of the second device using the given contact identifier; and
at least one instruction for causing the first device to attempt to initiate communication with the second device using the identified network address independently of the server.

* * * * *